US012028773B2

(12) United States Patent
Draayer et al.

(10) Patent No.: US 12,028,773 B2
(45) Date of Patent: Jul. 2, 2024

(54) SYSTEMS AND METHODS FOR ASSOCIATING AN OPERATOR WITH A VEHICLE

(71) Applicant: Hyster-Yale Group, Inc., Fairview, OR (US)

(72) Inventors: Nicholas M. Draayer, Portland, OR (US); Ryan P. McDermott, Fairview, OR (US)

(73) Assignee: Hyster-Yale Group, Inc., Fairview, OR (US)

( * ) Notice: Subject to any disclaimer, the term of this patent is extended or adjusted under 35 U.S.C. 154(b) by 44 days.

(21) Appl. No.: 17/459,852

(22) Filed: Aug. 27, 2021

(65) Prior Publication Data

US 2022/0070616 A1 Mar. 3, 2022

Related U.S. Application Data

(60) Provisional application No. 63/071,016, filed on Aug. 27, 2020.

(51) Int. Cl.
*H04W 4/02* (2018.01)
*H04W 4/06* (2009.01)

(52) U.S. Cl.
CPC ............ *H04W 4/023* (2013.01); *H04W 4/06* (2013.01)

(58) Field of Classification Search
CPC ...................................................... H04W 4/023
USPC ......................................................... 455/456.1
See application file for complete search history.

(56) References Cited

U.S. PATENT DOCUMENTS

| 2011/0279261 | A1* | 11/2011 | Gauger ................. B66F 17/003 340/669 |
| 2016/0232771 | A1* | 8/2016 | Mendiola .................. F16P 3/14 |
| 2018/0124234 | A1* | 5/2018 | Covington, Jr. ......... H04L 67/12 |

FOREIGN PATENT DOCUMENTS

JP 2015209718 A 11/2015

OTHER PUBLICATIONS

Extended European Search Report, EPO Pat. Appl. No. 21193513.5 (dated Jan. 31, 2022).

* cited by examiner

*Primary Examiner* — Ahmad F. Matar
*Assistant Examiner* — Jirapon Tulop

(57) ABSTRACT

Systems and methods associate operators with machinery, such as materials-handling vehicles. Embodiments of the disclosed system comprise a first communication module configured to determine a distance between a frame of reference associated with a vehicle and respective portable devices and first logic configured to designate a first portable device as an operator device based, at least in part, on a first distance determined by the communication module. The first logic may be further configured to exclude the first portable device from a pedestrian detection function in response to classifying the first portable device as an operator device.

15 Claims, 14 Drawing Sheets

SYSTEMS AND METHODS FOR ASSOCIATING AN OPERATOR WITH A VEHICLE

CROSS REFERENCE TO RELATED APPLICATIONS

This application claims priority to U.S. Provisional Patent Application No. 63/071,016 filed Aug. 27, 2020, which is hereby incorporated by reference in its entirety to the extent the incorporated subject matter is consistent with the present disclosure.

TECHNICAL FIELD

Embodiments relate to systems, methods, and devices for determining and/or maintaining associations between operators and machinery such as load-handling vehicles.

BACKGROUND

Unless otherwise explicitly indicated, the approaches described in the technical field and background sections are not prior art to the claims in this disclosure nor admitted prior art.

An electronic system of a vehicle (or vehicle system) may be configured to detect pedestrians and, in response, take actions to prevent accidents. For example, the vehicle system may alert the vehicle operator of nearby pedestrians that may not be readily visible to the vehicle operator, due to obstructions, a load being carried by the vehicle, or the like. The vehicle system may attempt to detect pedestrians using external or environmental sensing systems such as cameras, lidar, ultrasonic transducers, and so on. Alternatively, or in addition, the vehicle system may detect portable electronic devices carried by personnel through, inter alia, electronic signals or other communication means, such as ultra-wide band signals or the like. From the perspective of the vehicle system, detection of a portable device may represent detection of a pedestrian. Therefore, the vehicle system may take protective action(s) in response to detecting nearby portable devices. In this way, the portable devices may provide a degree of protection to personnel within a facility in which vehicles operate, such as a warehouse, distribution center, or the like. It may be difficult, however, to reliably distinguish personnel that are actively operating vehicles from pedestrians.

OVERVIEW OF DISCLOSURE

This overview is provided to introduce a selection of concepts in a simplified form that are further described in greater detail below. This overview is not intended to identify key or essential inventive concepts of the claimed subject matter, nor is it intended for limiting the scope of the claimed subject matter. Some example embodiments, alternative embodiments, and selectively cumulative embodiments are set forth below:

In some embodiments, a system for associating operators with a machine, such as a vehicle comprises a first communication module configured to determine distances between a frame of reference associated with a materials-handling vehicle and respective portable devices and first logic configured to designate a first portable device as an operator device based, at least in part, on a first distance determined by the communication module.

In some additional, alternative, or selectively cumulative embodiments, the first logic is further configured to exclude the first portable device from a pedestrian detection function in response to classifying the first portable device as an operator device.

In some additional, alternative, or selectively cumulative embodiments, the first portable device comprises a second communication module configured for two-way communication with the first communication module.

In some additional, alternative, or selectively cumulative embodiments, the first portable device is configured for operation in one of a pedestrian mode and an operator mode, wherein, in the pedestrian mode, the first portable device is configured to broadcast a detection signal, and wherein, in the operator mode, the first portable device is configured to terminate the broadcast of the detection signal.

In some additional, alternative, or selectively cumulative embodiments, the first logic is configured to classify the first portable device as an operator device in response to determining that the first distance is within a first proximity threshold.

In some additional, alternative, or selectively cumulative embodiments, the first logic is configured to classify the first portable device as an operator device during an operator registration period, and wherein the first logic is further configured to block classification of a second portable device detected within the first proximity threshold following the operator registration period.

In some additional, alternative, or selectively cumulative embodiments, the first logic is configured to classify the first portable device as an operator device in response to determining that the first distance is within a proximity region defined by one or more directional proximity thresholds.

In some additional, alternative, or selectively cumulative embodiments, the first logic is configured to classify the first portable device as a pedestrian device in response to determining that a distance between the first portable device and the frame of reference exceeds a second proximity threshold.

In some additional, alternative, or selectively cumulative embodiments, the first logic is configured to classify the first portable device as an operator device in response to detecting the first portable device within the second proximity threshold.

In some additional, alternative, or selectively cumulative embodiments, a method for associating operators with machines, such as vehicles comprises determining a proximity of one or more portable devices during an operator registration period, during which the operator registers to operate a materials-handling machine, wherein each portable device of the one or more portable devices configured to broadcast a respective detection signal; identifying a portable device within a first proximity threshold during the operator registration period; and designating the identified portable device as an operator device of the machine, the designating comprising causing the identified portable device to terminal broadcast of a detection signal.

In some additional, alternative, or selectively cumulative embodiments, the method further comprises detecting the proximity of the one or more portable device in response to a power-on event.

In some additional, alternative, or selectively cumulative embodiments, the method further comprising issuing an operator classification message to the identified portable device, the operator classification message configured to cause the identified portable device to transition from operation in a pedestrian mode to operation in an operator mode.

In some additional, alternative, or selectively cumulative embodiments, the method further comprises monitoring a proximity of the identified portable device during an operation period of the machine; and determining whether to reclassify the identified portable device as a pedestrian device based, at least in part, on the monitoring.

In some additional, alternative, or selectively cumulative embodiments, the method further comprises designating the identified portable device as an inactive operator device in response to determining that the identified portable device is outside a second proximity threshold.

In some additional, alternative, or selectively cumulative embodiments, the method further comprises reclassifying the identified portable device as an operator device in response to determining that the identified portable device is within the second proximity threshold.

In some additional, alternative, or selectively cumulative embodiments, the second proximity threshold differs from the first proximity threshold.

BRIEF DESCRIPTION OF THE DRAWINGS

Examples of systems, methods, devices, and computer-readable storage media comprising instructions configured to implement operations for associating operators with machinery are set forth in the accompanying figures and detailed description.

DETAILED DESCRIPTION

Figure 1:
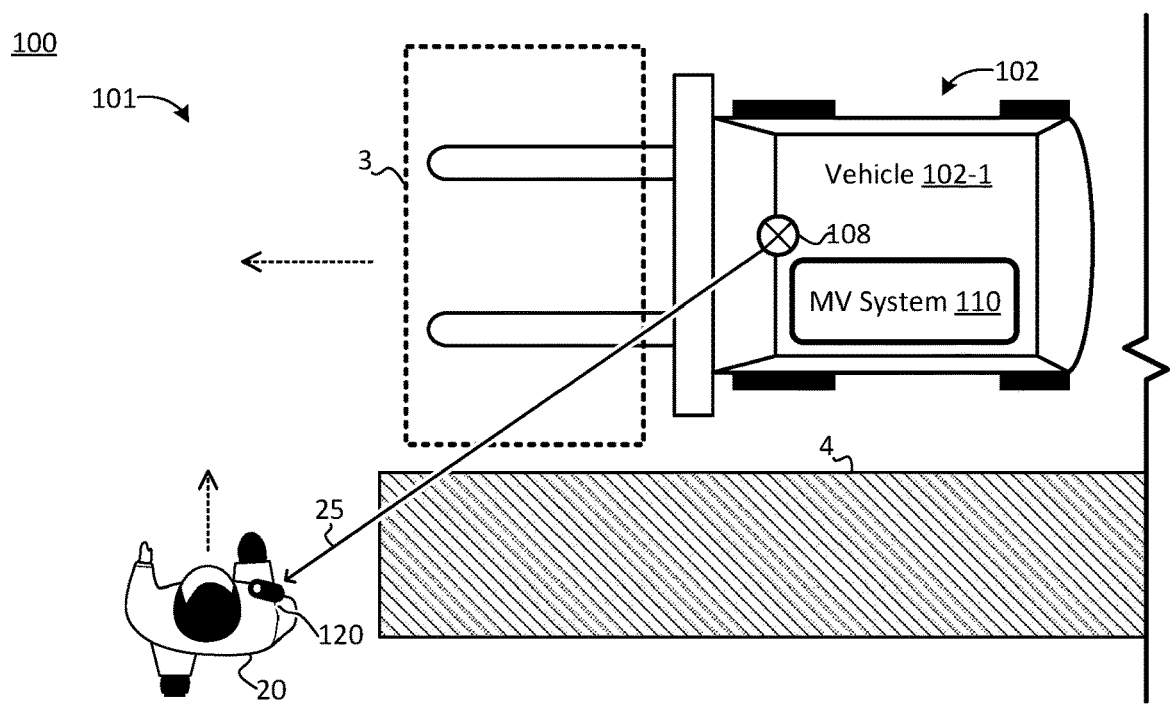
FIG. 1 illustrates an example operating environment including a system comprising apparatus that can implement aspects of vehicle management, as disclosed herein.

FIG. 1 illustrates an example of a system 100 comprising an operating environment 101 in which aspects of the disclosed technology for associating operators with machinery may be implemented. The operating environment 101 may comprise or correspond to a facility, such as a warehouse, distribution center, storeroom, depot, stock yard, or the like. The operating environment 101 may comprise one or more machines 102. As used herein, a machine 102 may comprise or refer to any suitable machinery or equipment that can be (a) associated with an operator and (b) may be operated in the vicinity of non-operators (pedestrians). A machine 102 may comprise or refer to conveyance means, means for handling or processing loads, means for handling or processing materials, and/or the like. As illustrated in FIG. 1, a machine 102 may comprise or refer to a vehicle 102-1. As used herein, a vehicle 102-1 may comprise or refer to any suitable means for conveyance including, but not limited to: a passenger conveyance (a conveyance configured to hold one or more occupants, including an operator), a non-passenger conveyance, a load-handling conveyance, a material-handling conveyance, a forklift, a warehouse forklift, a side loader, a telehandler, an industrial forklift, a rough terrain forklift, a pallet jack, a high-capacity forklift, a walkie stacker, a reach for truck, a three-wheel stand forklift, a utility cart, an electric motor rider truck, an electric narrow aisle truck, an electric motor hand or hand-rider truck, an internal combustion truck, autonomous equipment (configured for autonomous operation), or the like.

The system 100 may further comprise one or more machine or vehicle systems 110 (MV systems 110), each MV system 110 associated with a respective machine 102. An MV system 110 may be deployed on or within a machine 102. In the FIG. 1 example, the vehicle 102-1 may comprise and/or incorporate an MV system 110. The MV system 110 may be configured to detect pedestrians within the vicinity of the machine 102 (vehicle 102-1). The MV system 110 may be further configured to take one or more protective actions in response to detection of a pedestrian. The protective actions may include, for example, alerting the vehicle operator or pedestrian (e.g., emitting an audible alarm), asserting control over the vehicle 102-1 (e.g., slowing the vehicle 102-1), and/or the like.

In some implementations, the MV system 110 may be configured to detect persons 20 and other objects using external sensor systems such as cameras, lidar, ultrasonic transducers, and/or the like (external sensor systems not shown in FIG. 1 to avoid obscuring details of the illustrated examples). Alternatively, or in addition, the MV system 110 may be configured to detect portable devices 120. The system 100 may comprise a plurality of portable devices 120, each portable device 120 configured for association with a respective person 20. In some implementations, a portable device 120 may be worn, carried, held, attached to and/or otherwise associated with respective persons 20 within the operating environment 101.

The MV system 110 may be configured to detect portable devices 120 through any suitable electronic signaling and/or communication means, including, but not limited to: electromagnetic (EM) signals, radio signals, Ultra-Wide Band (UWB) signals, wireless networking signals, Near-Field Communication (NFC) signals, BLUETOOTH® communication signals, IEEE 802.11 signals (e.g., wireless networking signals in the 2.4 and/or 5 giga hertz (GHz) band), Radio-Frequency Identification (RFID) signals, Internet of Things (IoT) communication signals, and/or the like. Alternatively, or in addition, the MV system 110 may be configured to detect and/or communicate with portable devices 120 through network infrastructure of the operating environment 101 (an infrastructure network), such as a wireless network comprising one or more wireless access points, a Wi-Fi network, a BLUETOOTH network, or the like (infrastructure network not shown in FIG. 1 to avoid obscuring details of the illustrated embodiments).

The MV system 110 may be configured to detect and/or communicate with portable devices 120 within a detection or communication range (DC range) of the machine 102. The DC range may correspond to a detection or communication range of the MV system 110 and/or portable device(s) 120, e.g., may be based on characteristics and/or configuration(s) of the MV system 110 and portable devices 120. The MV system 110 may be further configured to determine a range or distance 25 to respective portable devices 120. The MV system 110 may be configured to determine the distance 25 to a portable device 120 by any suitable mean, technique, or algorithm, including, but not limited to: signal triangulation, signal trilateration, signal to noise (SNR) ratio, characteristics of signals detected and/or received from the portable device 120, signal strength, signal attenuation, signal timing, signal propagation time, phase shift, and/or the like. Alternatively, or in addition, the MV system 110 may be configured to determine distances 25 based on an external or network-based positioning system, such as a wireless network positioning system (e.g., a Wi-Fi positioning system), a global navigation satellite system (GNSS), a Global Positioning System (GPS), or the like.

The MV system 110 may be configured to determine distances 25 to detected portable devices 120 (and corresponding persons 20). The MV system 110 may determine distances 25 relative to a frame of reference 108 (or simply reference 108). The reference 108 may comprise and/or correspond to a point, an area, a volume, or other frame of reference relative to the machine 102 associated with the MV system 110 (e.g., the vehicle 102-1). In some implementations, the reference 108 may correspond to communication infrastructure of the MV system 110. For example, the reference 108 may correspond to a location of a signal receiver, transmitter, transceiver, antenna, or other communication component(s).

The MV system 110 may be capable of detecting persons 20 that may not be readily visible to the operator of the vehicle 102-1. As illustrated in FIG. 1, the MV system 110 may detect a portable device 120 carried by a person 20 that may be obscured from view of the vehicle operator and/or external sensor systems of the vehicle 102-1 by, inter alia, structural elements of the vehicle 102-1, the load 3 being carried by the vehicle 102-1, obstructions within the operating environment 101, such as warehouse shelving 4, and/or the like. Similarly, the vehicle 102-1 may be obscured from view of the person 20. In the FIG. 1 example, the person 20 may be moving into the path of the vehicle 102-1 (e.g., the vehicle 102-1 and the person 20 may be on a "collision course"). In response to detection of the personal device 120, the MV system 110 may determine and/or implement one or more protective actions. The protective actions may be configured to prevent accidents involving pedestrians, such as the person 20, and may include, but are not limited to, alerting the operator of the machine 102 that pedestrian(s) are in close proximity to the machine 102, alerting persons 20 to the presence of the machine 102 (e.g., sounding an audible alarm, activating one or more lights, and/or the like), implementing one or more control actions pertaining to operation of the machine 102 (e.g., slowing the vehicle 102-1, turning the vehicle 102-1, stopping the vehicle 102-1, or the like), and so on. Alternatively, or in addition, the protective actions may be determined and/or implemented by other component(s) of the machine 102, such as an on-board safety system, a collision avoidance system, or the like (not shown in FIG. 1 to avoid obscuring details of the illustrated examples).

Figure 2A:
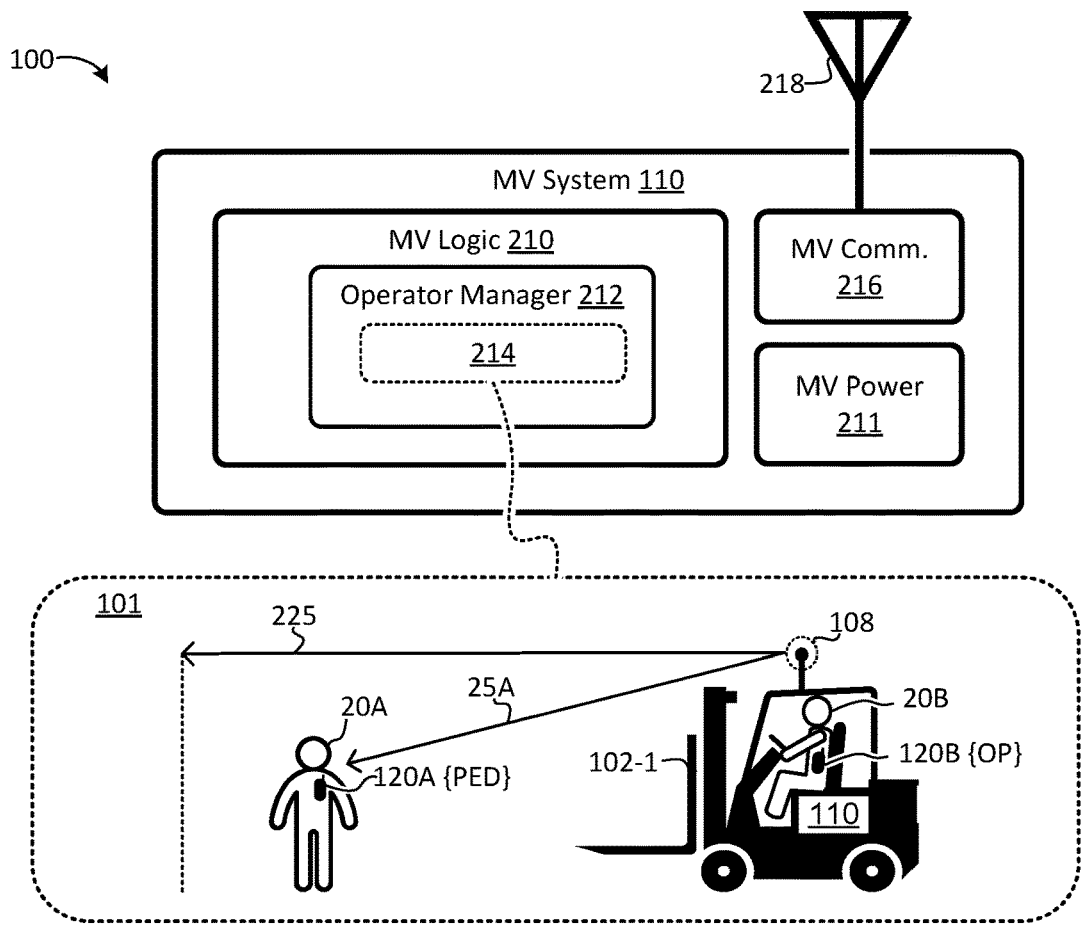
FIGS. 2A-2D are schematic block diagrams illustrating examples of machine or vehicle systems.

FIG. 2A is a schematic block diagram of an example of an MV system 110. The MV system 110 may comprise machine or vehicle (MV) logic 210 (also referred to as first logic 210 herein). The MV logic 210 may comprise and/or be embodied by circuitry, logic circuitry, a logic chip, an integrated circuit (IC), an application-specific integrated circuit (ASIC), programmable logic, a Field Programmable Gate Array (FPGA), a System on Chip (SoC), a computing device, instructions stored on a non-transitory computer-readable storage medium, and/or the like.

The MV system 110 may further comprise and/or be coupled to a machine or vehicle (MV) communication module 216. The MV communication module 216 may comprise and/or be coupled to one or more signal receivers, signal transmitters, signal transceivers, and/or the like (e.g., one or more MV antenna 218). The MV communication module 216 may be configured to detect portable devices 120 within a detection or communication range of the MV system, communicate with selected portable devices 120, determine distances 25 to respective portable devices 120 (relative to a reference of reference 108, as disclosed herein).

In some implementations, the MV communication module 216 may be configured for one-way detection or communication; for example, the MV communication module 216 may be configured to detect signals returned from portable devices 120 in response to interrogation signal(s), detect signals emitted or broadcast by respective portable devices 120, and/or the like. Alternatively, or in addition, the MV communication module 216 may be configured for two-way communication with respective portable devices 120. The MV communication module 216 may be configured for direct two-way communication, such as point-to-point communication, point-to-point NFC communication, EM signal communication, radio communication, infrared communication, ultrasonic communication, and/or the like. Alternatively, or in addition, the MV communication module 216 may be configured for indirect two-way communication, such as communication through a network, a wireless network, an Internet Protocol (IP) network, a wireless IP network, a local area network (LAN), a wide area network (WAN), a BLUETOOTH® network, an IoT network, and/or the like.

In some embodiments, the MV system 110 may further comprise a power source (machine or vehicle (MV) power source 211). The MV power source 211 may comprise an energy storage system, such as a battery, power cell, or the like. Alternatively, or in addition, the MV power source 211 may comprise and/or be coupled to a power source of the machine 102 (or vehicle 102-1) associated with the MV system 110.

The MV logic 210 may be configured to determine, maintain, monitor, and/or otherwise manage portable device (PD) association data 214. As disclosed in further detail herein, the PD association data 214 may be configured to identify and/or distinguish portable devices 120 that are associated with machine or vehicle operators (OP) from portable devices 120 associated with non-operators or "pedestrians" (PED). Therefore, as used herein, an "OP portable device" 120 may refer to a portable device 120 of a person 20 determined to be an operator of a machine 102 (or vehicle 102-1) per the PD association data 214 and a "PED portable device" 120 may refer to a portable device 120 of a person 20 determined to be a non-operator or pedestrian.

The MV system 110 may utilize the PD association data 214 to, inter alia, implement a pedestrian (PED) detection function. As used herein, "PED detection" or a "PED detection function" of an MV system 110 refers to detection of pedestrians and/or PED portable devices 120 in the vicinity of the machine 102 (or vehicle 102-1) associated with the MV system 110. In the FIG. 2A example, the MV logic 210 may be configured to implement a PED detection function, comprising detecting portable devices 120 that are (a) designated as PED portable devices 120 and (b) are within a defined protection zone 225. As illustrated in the FIG. 2A example, the protection zone 225 may correspond to and/or be defined relative to the frame of reference 108 of the MV system 110. Detection of a PED portable device 120 within the protection zone 225 may trigger the PED detection function of the MV logic 210, which may result in implementation of one or more protective actions, as disclosed herein. In some embodiments, the MV system 110 may comprise a programmed or configured protection zone 225. The protection zone 225 may be determined in accordance with safety considerations, capabilities of the machine 102 or vehicle 102-1 (e.g., maximum speed of the vehicle 102-1) and/or the like. Alternatively, or in addition, the MV system 110 may be configured to implement an adaptive protection zone 225. The MV logic 210 of the MV system 110 may be configured to adapt the protection zone 225 based on operating conditions of the machine 102 or vehicle 102-1. For example, the MV logic 210 may be configured to expand the protection zone 225 in proportion to a velocity of the vehicle 102-1 (increase the coverage of the protection zone 225 with increasing velocity).

In the FIG. 2A example, the portable device 120A of person 20A may be designated as a PED (may be configured for operation in PED mode, as disclosed in further detail herein). Accordingly, detection of the PED portable device 120A within the protection zone 225 may trigger the PED detection function of the MV logic 210. For example, the speed of the vehicle 102-1 may be reduced while the PED portable device 120A is detected and/or remains within the protection zone 225.

As further illustrated in the FIG. 2A example, the portable device 120B of person 20B is also located within the protection zone 225 of the MV system 110. The portable device 120B is associated with an operator of the vehicle 102-1. However, if the portable device 120B were treated as a PED, the PED detection function of the MV logic 210 could be triggered, and remain triggered, during operation of the vehicle 102-1 by the person 20B (since the portable device 120B would remain within the protection zone 225). To address these and other issues, the MV logic 210 may be configured to associate machines 102 (or vehicles 102-1) with operators, as disclosed herein. As illustrated in FIG. 2A, the PD association data 214 maintained by the MV logic 210 may indicate that the portable device 120B is an OP portable device 120B (is associated with an operator of the vehicle 102-2). The MV logic 210 may utilize the PD association data 214 to prevent detection of the OP portable device 120B within the protection zone 225 from triggering the PED detection function. In other words, the MV logic 210 may incorporate the PD association data 214 into the PED detection function such that OP portable devices 120 within the protection zone 225 do not trigger PED detection (and/or implementation of corresponding protective functions).

Figure 2B:
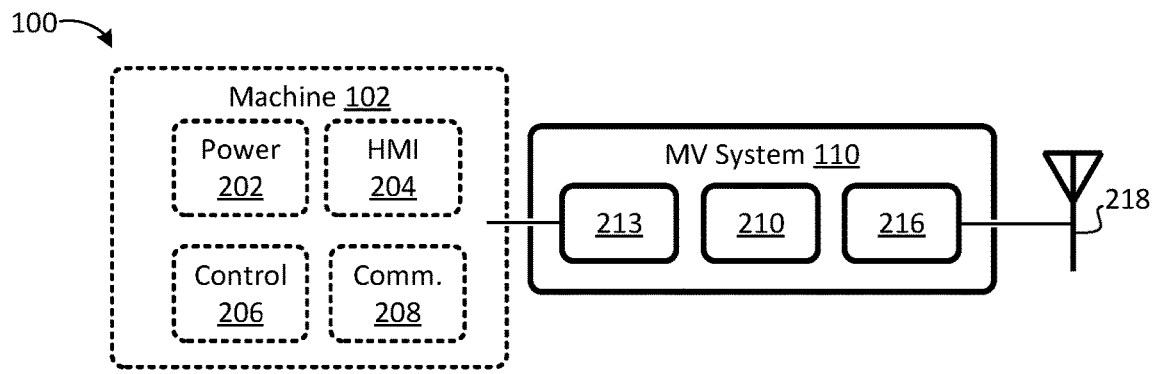

FIG. 2B is a schematic block diagram illustrating another example of an MV system 110. The MV system 110 may comprise MV logic 210 and an MV communication module 212, as disclosed herein. In the FIG. 2B example, the MV system 110 may further comprise a machine or vehicle (MV) interface 213. The MV interface 213 may be configured to operably and/or communicatively couple the MV system 110 to a machine 102, such as a vehicle 102-1 or the like. The MV interface 213 may be configured to couple the MV system 110 to a power supply 202 of the machine 102. Alternatively, or in addition, the MV system 110 may comprise and/or be coupled to a separate, independent power source (e.g., an MV power supply 211). The MV interface 213 may be further configured to operably and/or communicatively couple the MV system 110 to other components of the machine 102, such as a human-machine interface (HMI) 204 of the machine 102, a control system 206 of the machine 102, a communication interface 208 of the machine 102, and/or the like. The control system 206 may be configured to implement protective actions triggered by a PED detection function of the MV system 110, as disclosed herein. The control system 206 may comprise and/or be coupled to an on-board safety system, a collision avoidance system, or the like. In some embodiments, the MV system 110 may be configured to utilize the communication interface 208 of the machine 102 to detect and/or communicate with portable devices 120; in other words, at least a portion of the MV communication module 216 (and/or antenna 218) of the MV system 110 may comprise and/or be embodied by the communication interface 208 of the machine 102.

Figure 2C:
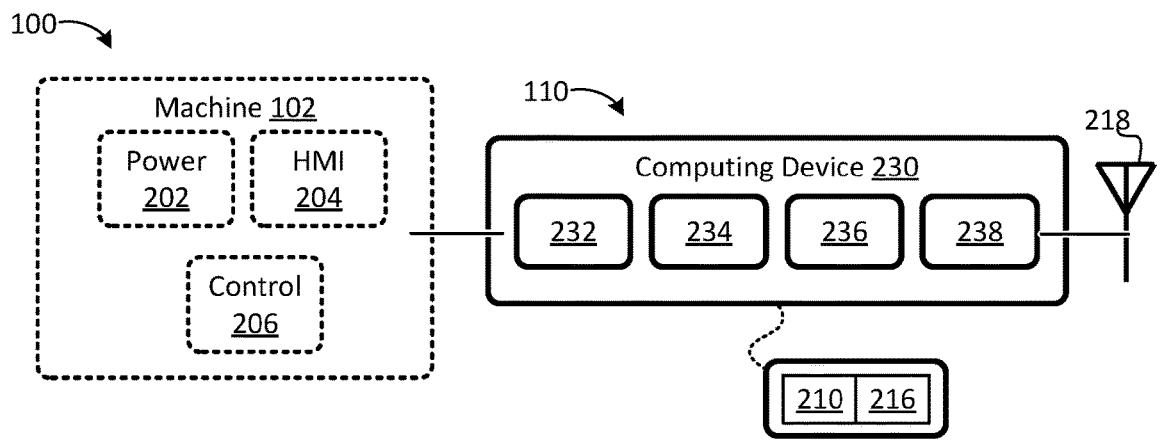

FIG. 2C is a schematic block diagram illustrating another example of an MV system 110. In the FIG. 2C example, the MV system 110 may comprise and/or be embodied by a computing device 230. The computing device 230 may comprise a processor 232, memory 234, and non-transitory storage medium 236. In some embodiments, the computing device 230 may comprise an on-board or embedded computing device of the machine 102 (e.g., vehicle 102-1). Alternatively, the computing device 230 may be separate and/or independent of the machine 102 (e.g., may be communicatively or operatively coupled to the machine 102, as disclosed herein).

The MV logic 210 may be configured for operation on the computing device 230. The MV logic 210 may comprise and/or be embodied by instructions stored on the non-transitory storage medium 236. The instructions of the MV logic 210 may be loaded into the memory 234 of the computing device 230, e.g., for execution by the processor 232. The instructions may be configured to cause the processor 232 to implement operations for associating operators with machinery, as disclosed in further detail herein. The computing device 230 may be communicatively and/or operatively coupled to the machine 102 and/or one or more components thereof, as disclosed herein. The computing device 230 may be coupled to one or more of a power supply 202, HMI 204, and control interface 206 of the machine 102. Alternatively, or in addition, the computing device 230 may be coupled to a separate, independent power source.

In some implementations, the computing device 230 may further comprise a communication unit 238, which may comprise and/or be coupled to one or more signal receivers, signal transmitters, signal transceivers, and/or the like (e.g., one or more MV antenna 218). In these implementations, the MV communication module 212 may comprise and/or be embodied, at least in part, by the communication unit 238 of the computing device 230.

Figure 2D:
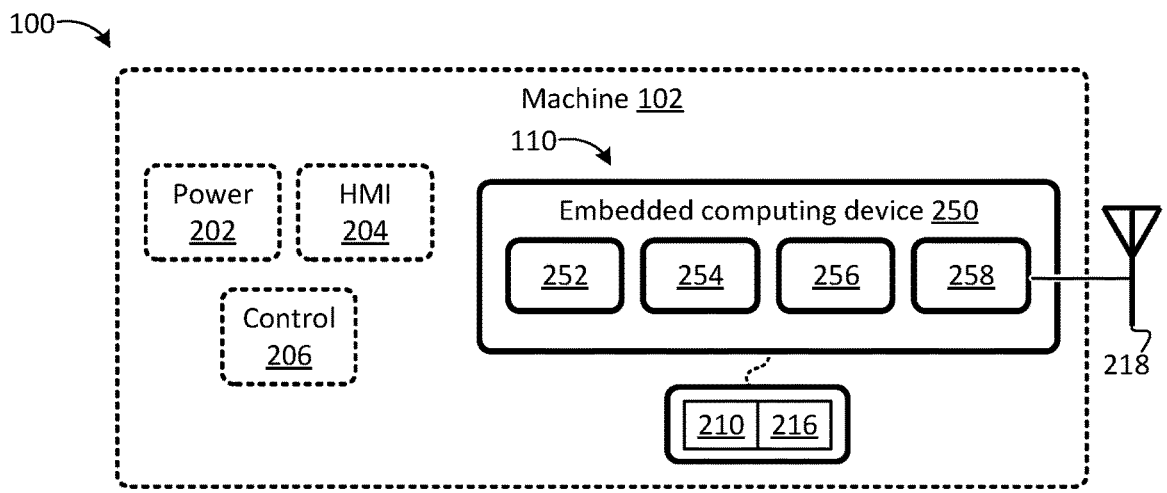

FIG. 2D is a schematic block diagram illustrating another example of an MV system 110. In the FIG. 2D example, the MV system 110 may comprise and/or be embodied by an embedded computing device 250. The embedded computing device 250 may be incorporated and/or integrated into the machine 102. The embedded computing device 250 may comprise a processor 252, memory 254, and non-transitory storage medium 256. In some implementations, the on-board computing device 250 may further comprise a communication unit 258, as disclosed herein.

Figure 3A:
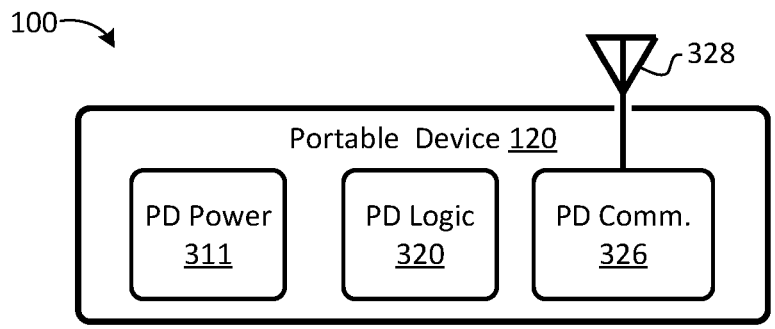
FIGS. 3A-3C are schematic block diagrams illustrating examples of portable devices.

FIG. 3A is a schematic block diagram of an example of a portable device 120. The portable device 120 may comprise a power source 311, such as a battery or the like. The portable device 120 may further comprise portable device (PD) logic 320. The PD logic 320 may comprise and/or be embodied by circuitry, logic circuitry, a logic chip, an IC, an ASIC, programmable logic, an FPGA, a SoC, and/or the like. Alternatively, or in addition, the PD logic 320 may comprise and/or be embodied by instructions stored on a computer-readable storage medium.

The portable device 120 may further comprise a portable device (PD) communication module 326. The PD communication module 326 may be configured for detection by and/or electronic communication with an MV system 110, as disclosed herein. The PD communication module 326 may comprise and/or be coupled to one or more signal receivers, signal transmitters, signal transceivers, and/or the like (e.g., one or more PD antenna 328). In some implementations, the PD communication module 326 may be configured for one-way communication; the PD communication module 326 may be configured to respond to interrogation signals generated by an MV system 110, emit or broadcast signals capable of being detected by MV systems 110, and/or the like. Alternatively, or in addition, the PD communication module 326 may be configured for two-way communication with an MV system 110. The PD communication module 326 may be configured for direct and/or indirect two-way communication, as disclosed herein.

Figure 3B:
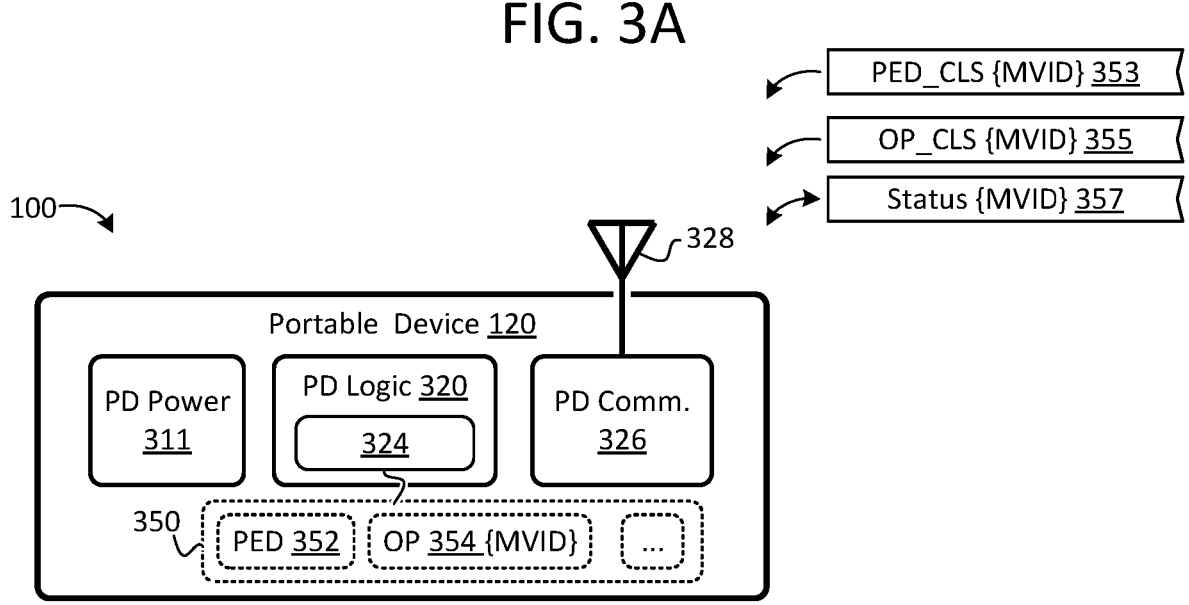

FIG. 3B is a schematic block diagram illustrating another example of a portable device 120. The PD logic 320 may be configured to operate in one or more of a plurality of operating modes. In some embodiments, the PD logic 320 may comprise and/or maintain portable device (PD) configuration data 324, which may comprise information pertaining to the determined operating mode of the portable device 120. The operating modes may correspond to respective portable device (PD) designations 350, which may include, but are not limited to a pedestrian (PED) designation 352, an operator (OP) designation 354, and so on.

Designating a portable device 120 as a PED portable device 120 may comprise storing a PED designation 352 in the PD configuration data 324 and/or configuring the portable device 120 to operate in a PED mode. The PED mode may be adapted to configure the portable device 120 for detection by and/or communication with any MV system 110 within detection or communication range. The PED mode may be adapted to configure the portable device 120 to be detected by PED detection functions implemented by the MV systems 110 of respective vehicles 102-1 (e.g., enable the portable device 120A to be detected within the protection zone 225 of the MV system 110, as illustrated in FIG. 2A). The PED mode may comprise and/or correspond to a PED communication mode. The PED communication mode may comprise configuring the PD communication module 326 for detection by and/or communication with MV system 110, as disclosed herein, which may comprise configuring the PD communication module 326 to respond to interrogation signals generated by MV systems 110, broadcast or emit signals configured for detection by MV systems 110 (detection signals), and/or the like.

Alternatively, or in addition, a portable device 120 may be designated as an operator of a machine 102 or vehicle 102-1 by the MV system 110 of the machine 102 or vehicle 102-1.

As disclosed in further detail herein, a portable device 120 may be designated as an operator of the machine 102 or vehicle 102-1 of a specified MV system 110 in response to an operator classification (OP_CLS) message 355. The OP_CLS message 355 may comprise an identifier of the specified MV system 110 (an MVID).

Designating the portable device 120 as an operator may comprise associating or "pairing" the portable device 120 with the specified MV system 110 by, inter alia, storing an OP designation 354 and/or corresponding MVID in the PD configuration data 324. The OP designation 354 may be adapted to configure the portable device 120 to operate in the OP mode. The OP mode may configure the portable device 120 for communication with the specified MV system 110 (per the MVID). In the OP mode, the PD communication module 326 may be configured to prevent detection of the portable device 120 by other MV systems 110. In the OP mode, the PD communication module 326 may be configured to ignore communication from MV systems 110 other than the MV system 110. The PD communication module 326 may be further configured to ignore interrogation signal(s) from other MV systems 110, cease the emission or broadcast of detection signals, and/or the like. Accordingly, in OP mode, the portable device 120 may not be detected as a pedestrian in PED detection operations of MV systems 110.

As disclosed herein, when designated as the OP by a specified MV system 110, the portable device 120 may be configured to communicate with the MV system 110. In some embodiments, status messages 357 may be communicated between the MV system 110 and the associated portable device 120. The status messages 357 may be configured to verify nominal operation of the portable device 120 and/or MV system 110, monitor the proximity of the portable device 120 to the frame of reference 108 of the MV system 110, and/or the like. The status messages 357 may comprise heartbeat messages, handshake messages, keep-alive messages, and/or the like.

In some implementations, the OP designation 354 of the portable device 120 may be removed. Removing the OP designation 354 may comprise configuring the portable device 120 for operation in the PED mode, as disclosed herein (e.g., replacing the OP designation 354 with the PED designation 352). The PD logic 320 may be configured to remove the OP designation 354 from the portable device 120 in response to a pedestrian classification (PED_CLS) message 353; the OP designation 354 of the portable device 120 may be removed in response to verifying the MVID or other authentication data of the PED_CLS message 353 (e.g., matching the MVID of the PED_CLS message 353 to the MVID of the OP designation 354). Alternatively, or in addition, the PD logic 320 may be configured to remove the OP designation 354 in response to a timeout condition or the like. For example, the PD logic 320 may remove the OP designation 354 in response to failing to receive a status message 357 and/or receive an acknowledgement of issued status message(s) 357 for at least a portable device (PD) communication timeout threshold.

Figure 3C:
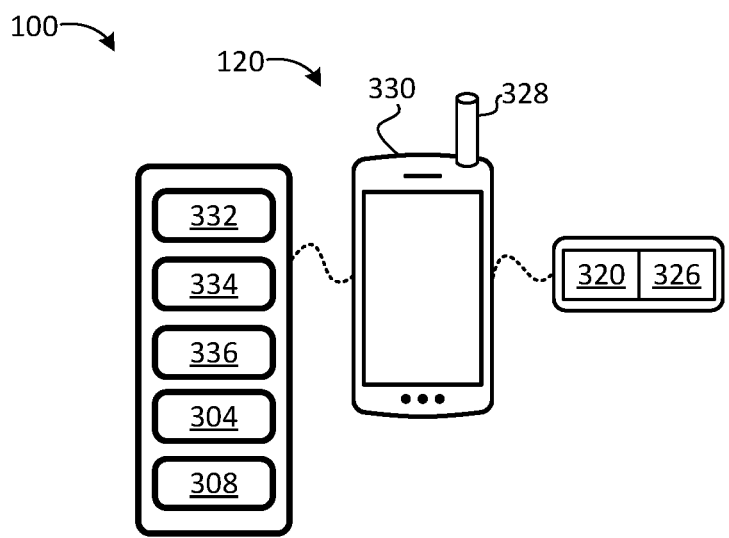

FIG. 3C is a schematic block diagram illustrating another example of a portable device 120. In the FIG. 3C example, the portable device 120 may comprise and/or be embodied by a mobile communication device 330, such as a smart phone, portable computing device, tablet, personal digital assistant (PDA), terminal, or the like. The mobile communication device 330 may comprise computing resources, which may include, but are not limited to a processor 332, memory 334, and non-transitory storage medium 336. The mobile communication device 330 may further comprise mobile HMI components 304, such as a touch screen display, audio outputs, audio inputs, one or more buttons, and/or the like.

In the FIG. 3C implementation, the PD logic 320 may comprise and/or be embodied by instructions stored on the non-transitory storage medium 336. The instructions of the PD logic 320 may be loaded into the memory 334 of the mobile communication device 330, e.g., for execution by the processor 332. The instructions may be configured to cause the processor 332 to implement operations for associating operators with machinery, as disclosed herein.

In some embodiments, the mobile communication device 330 may further comprise a mobile communication unit 308. In these embodiments, at least a portion of the PD communication module 326 may comprise and/or be embodied by the mobile communication unit 308. The mobile communication unit 308 may comprise and/or be coupled to one or more signal receivers, signal transmitters, signal transceivers, and/or the like (e.g., one or more PD antenna 328). The mobile communication unit 308 may be configured for detection by and/or communication with an MV system 110, as disclosed herein.

Referring back to FIG. 2A, the MV system 110 may be configured to implement a PED detection function. The PED detection function may utilize information pertaining to respective portable devices 120. For example, the PED detection function may determine and/or maintain PD association data 214, the PD association data 214 configured to, inter alia, identify OP portable devices 120 (portable devices 120 associated to machine or vehicle operators). Alternatively, or in addition, the PD association data 214 may be configured to identify PED portable devices 120 (portable devices 120 associated with non-operators or pedestrians) from OP portable devices 120.

In some embodiments, the MV system 110 of a machine 102 may be configured to identify or register operator(s) of the machine 102. Registering a portable device 120 as an operator of the machine 102 may comprise designating the portable device 120 as an OP in PD association data 214 of the MV system 110, configuring the portable device 120 to operate in OP mode (e.g., issuing an OP_CLS message 355 to the portable device 120), and/or the like.

In some implementations, the MV system 110 may be configured to distinguish portable devices 120 of operators from portable devices 120 of pedestrians based on the proximity of the portable devices 120 to the MV system 110 (and/or frame of reference 108 thereof). In the examples illustrated in FIGS. 4A through 4C, portable devices 120 within a first proximity threshold 425 may be designated as OP portable devices 120 and portable devices 120 outside of the first proximity threshold may be designated as PED portable devices 120.

Figure 4A:
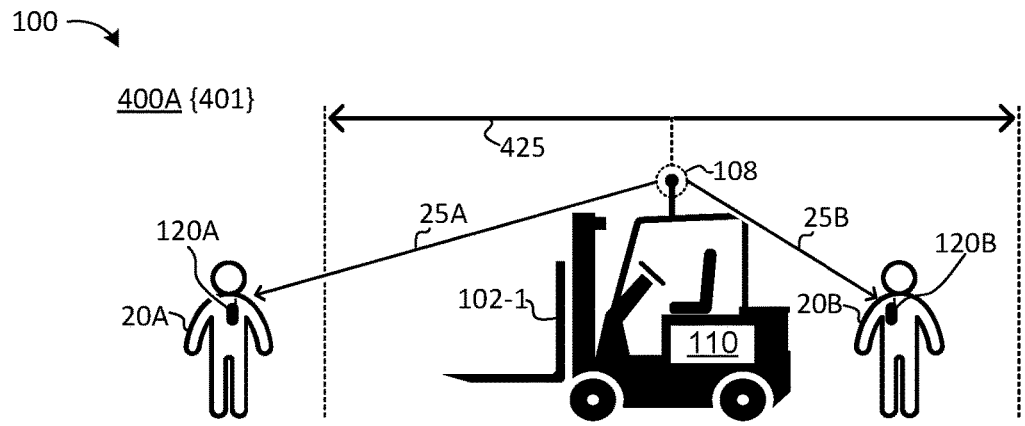
FIGS. 4A-4C are schematic block diagrams illustrating examples of machine or vehicle systems configured to distinguish operators from pedestrians based on proximity.

FIG. 4A illustrates an example of an MV system 110 configured to distinguish operators from pedestrians based on a first proximity threshold 425. The first proximity threshold 425 may correspond to a frame of reference 108 of the MV system 110; the first proximity threshold 425 may extend at any suitable angular orientation from the reference 108. As disclosed in further detail herein, the MV system 110 may use the first proximity threshold 425 to identify operators of the vehicle 102-1 and, as such, may be referred to as a first operator (OP) threshold 425, an OP proximity threshold 425, or the like.

In the FIG. 4A example, the portable device 120A fails to satisfy the first proximity threshold 425, whereas the portable device 120B satisfies the first proximity threshold 425. In other words, the distance 25A between the portable device 120A and the reference 108 exceeds the first proximity threshold 425 whereas the distance 25B between the portable device 120B and the reference 108 is less than or equal to the first proximity threshold 425.

In state 400A illustrated in FIG. 4A, the vehicle 102-1 (and corresponding MV system 110) may be in an inactive, dormant, or powered off state (an inactive state 401). Accordingly, in state 400A, neither of the portable devices 120A nor 120B may be classified as a pedestrian or operator by the MV system 110. The portable devices 120A and 120B may have respective PED designations 352 and, as such, may be configured to operate in accordance with the PED mode, as disclosed herein.

Figure 4B:
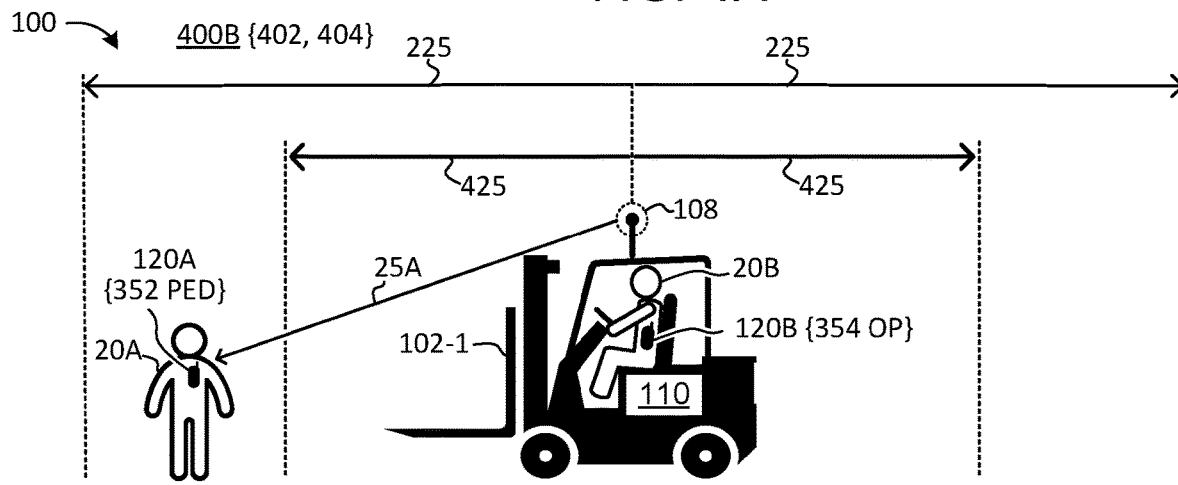

FIG. 4B illustrates an example of the MV system 110 in a second state 400B. The state 400B may correspond to startup or initialization of the vehicle 102-1 and/or MV system 110 (an initialization state 402). Alternatively, the state 400B may correspond to an operating state 404 of the vehicle 102-1. The operating state 404 may correspond to completion of a startup or initialization process involving the vehicle 102-1 and/or MV system 110. In state 400B, the vehicle 102-1 may be powered on by an operator (person 20B). In response, the MV system 110 may be configured to identify portable devices 120 that satisfy the first proximity threshold 425 and register the identified portable devices 120 as operators. In the FIG. 4B example, the MV system 110 may register the portable device 120B as an operator in response to determining that the portable device 120B is within the first proximity threshold 425. Registering the portable device 120B may comprise configuring the portable device 120B to operate in the OP mode, as disclosed herein. In some embodiments, the MV system 110 may be configured to issue an OP_CLS message 335 to the portable device 120B. In response to the OP_CLS message 335, PD logic 320 of the portable device 120B may store an OP designation 354 and/or MVID of the MV system 110 within the PD configuration data 324, configure the portable device 120 to operate in the OP mode (e.g., pair the portable device 120B with the MV system 110), and so on. By contrast, the portable device 120A may not be designated as an operator since the distance 25A to the portable device 120A exceeds the first proximity threshold 425. The portable device 120A may, therefore, continue operating in the PED mode (per the PED designation 352).

Alternatively, the MV system 110 may be configured to distinguish operators from pedestrians based on relative proximities of the portable devices 120. For example, the MV system 110 may identify the portable device 120 that is nearest to the frame of reference 108 during startup and, in response, designate the identified portable device 120 as an operator. Other portable devices 120 further from the frame of reference 108 may remain pedestrians, even if the other portable devices 120 are within a first proximity threshold 425.

During operation, MV system 110 may be configured to implement a PED detection function. As disclosed herein, PED detection may comprise identifying PED portable devices 120 within a defined protection zone 225. As illustrated in FIG. 4B, the protection zone 225 may extend beyond the first proximity threshold 425. The disclosure is not limited in this regard, however, and may be adapted to implement any suitable thresholds having any suitable relationships. For example, in some embodiments, the protection zone 225 may correspond to and/or be substantially equivalent to the first threshold 425. In other embodiments, the protection zone 225 may be less than or equal to the first threshold 425, or the like.

In state 400B, the PED detection function of the MV system 110 may be triggered in response to determining that the PED portable device 120A is within the protection zone 225 (e.g., in response to determining that the distance 25A is less than or equal to a threshold distance of the protection zone 225). In response, the MV system 110 or other component(s) of the vehicle 102-1 may implement one or more protective actions, as disclosed herein.

Figure 4C:
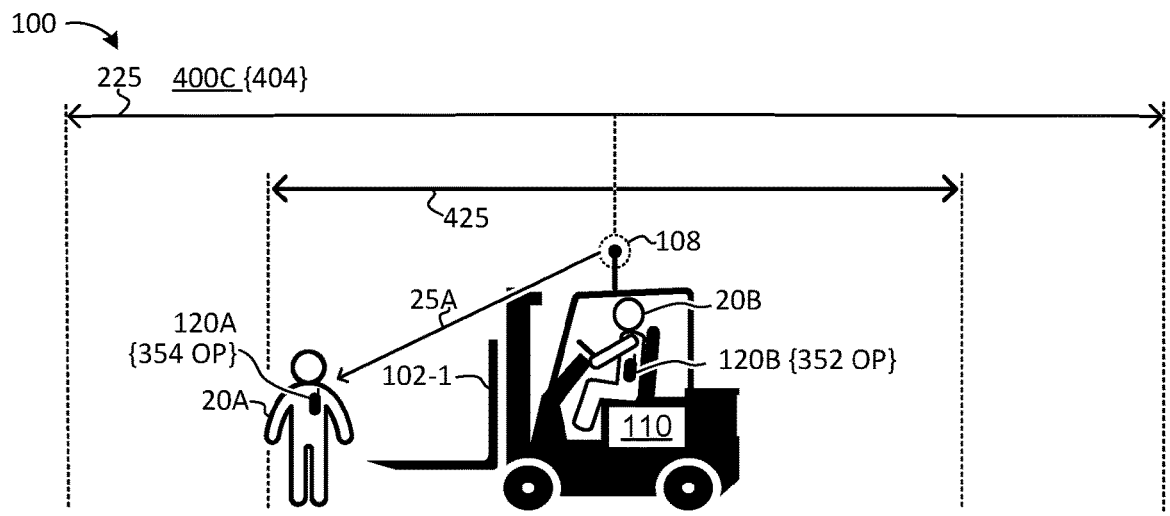

FIG. 4C illustrates an example of an MV system 110 in third state 400C, which may correspond to another operating state 404 of the vehicle 102-1. The portable device 120B may remain registered as an operator by the MV system 110 (since the portable device 120B remains within the first proximity threshold 425). As shown in FIG. 4C, the person 20A may have moved within the first proximity threshold 425. As a result, the portable device 120A of the person 20A may satisfy the first proximity threshold 425 and, as such, the portable device 120A may be registered as an operator by the MV system 110. Accordingly, in state 400C, the PED detection function of the MV system 110 may no longer be triggered by the portable device 120A (and the person 20A may not be protected by the corresponding protective actions).

Figure 5:
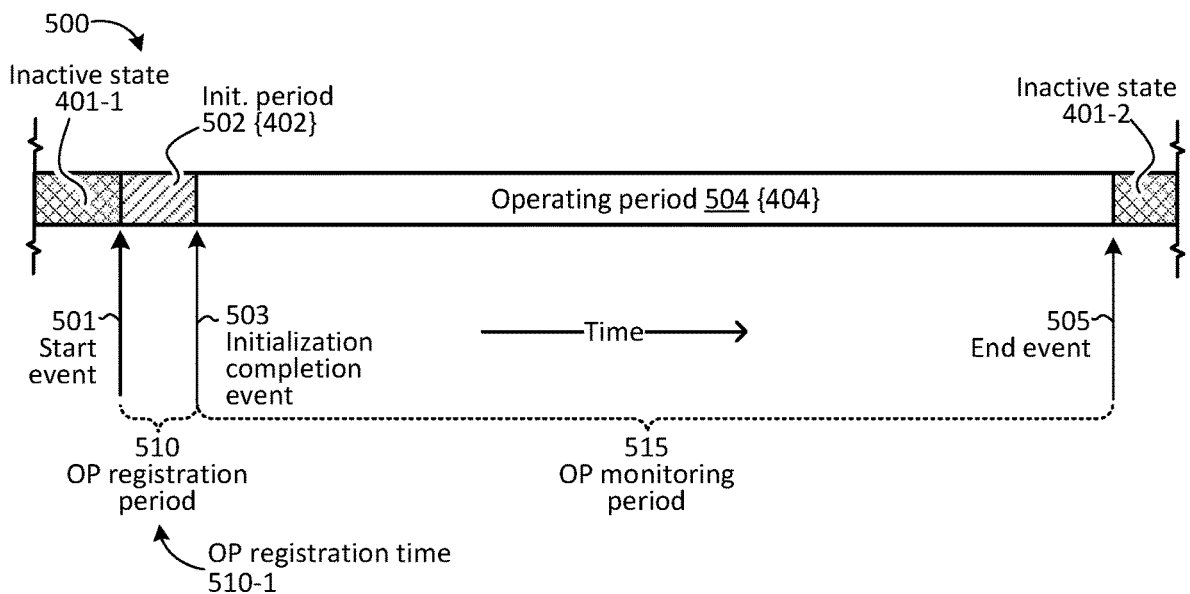
FIG. 5 illustrates an example of an operation cycle.

In some implementations, the MV system 110 may be configured to identify and/or register operators of the machine 102 at designated time(s) during an operation cycle 500 of the machine 102, as illustrated in FIG. 5. As used herein, a "operation cycle" 500 refers to operation of a machine 102 during a designated time period, such as a time period between inactive states 401 of the machine 102. The operation cycle 500 illustrated in FIG. 5 corresponds to operation of a vehicle 102-1 and, in particular, a time period between a first inactive state 401-1 of the vehicle 102-1 and a second inactive state 401-2 of the vehicle 102-1. The operation cycle 500 may begin in response to a start event 501. The start event 501 may comprise and/or correspond to a startup event, vehicle ignition, a power on event, insertion of a key into an ignition or start switch of the vehicle 102-1, a power cycle event, reinitialization of the vehicle 102-1 (e.g., resetting the vehicle 102-1), and/or the like. In some implementations, the operation cycle 500 may further comprise an initialization period 502. The initialization period 502 may correspond to initialization of the vehicle 102-1, e.g., may correspond to an initialization state 402 of the vehicle 102-1 (and/or MV system 110), as disclosed herein. The initialization period 502 may, for example, correspond to a period during which the vehicle 102-1 and/or MV system 110 transition from the inactive state 401-1 to an operating state 404. The initialization period 502 may complete in response to an initialization completion event 503. The initialization completion event 503 may correspond to completion of one or more automated or manual initialization operations pertaining to the vehicle 102-1 and/or MV system 110, such as one more safety tests, functionality tests, startup processes, initialization processes, and/or the like. The initialization overhead of some machines 102 may be relatively high, e.g., the initialization period 502 may be relatively lengthy (e.g., 5 to 30 seconds or more) and/or involve completion of one or more manual initialization processes by the machine operator (or other personnel). Conversely, the initialization overhead of other machines 102 may be relatively low; the initialization period 502 of such machines 102 may be short or substantially instantaneous.

The operating period 504 may correspond to operation of the vehicle 102-1, e.g., may correspond to an operating state 404 of the vehicle 102-1 and/or MV system 110. The operation cycle 500 may terminate in response to an end event 505. The end event 505 may comprise a transition to an inactive state 401, such as the second inactive state 401-2 illustrated in FIG. 5. The end event 505 may comprise and/or correspond to a shutdown event, a power off event, a power down event, a power cycle event, a reinitialization event, a restart event, and/or the like.

In some implementations, the MV system 110 of a machine 102, such as a vehicle 102-1 may be configured to register operators during an OP registration period 510 and/or at an OP registration time 510-1. The OP registration time 510 may correspond to an operation cycle 500 of the machine 102, such as the operation cycle 500 illustrated in FIG. 5. The OP registration period 510 may correspond to a time or time period at or between the start event 501 and the initialization completion event 503. Alternatively, the OP registration time 510 may extend beyond the initialization completion event 503. The OP registration period 510 may be programmed or otherwise configured to comprise any suitable time period (e.g., 0 or more seconds from the start event 501 and/or the time at which power is initially supplied to the MV system 110). The OP registration period 510 of an operation cycle 500 may correspond to a period between the start event 501 and the initialization completion event 503 of the operation cycle 500. The OP registration period 510 may, for example, comprise and/or correspond to a portion of the initialization period 502 of the operation system 500. Alternatively, or in addition, the OP registration period 510 may be adapted according to the initialization overhead of the vehicle 102-1 (or machine 102). For example, initialization of the vehicle 102-1 may involve one or more manual operations, which may require the operator to move around the vehicle 102-1 or even temporarily leave the first proximity threshold 425. The OP registration period 510 may be configured such that the portable device 120 of the operator is within the first proximity threshold 425 for at least a portion of the OP registration period 510.

The MV system 110 may be configured to register operators of the vehicle 102-1 during the OP registration period 510. In a first non-limiting example, the MV system 110 may be configured to identify portable devices 120 that are within the first proximity threshold 425 during the OP registration period 510 and may register the identified portable devices 120 as operators of the vehicle 102-1.

In a second non-limiting example, the MV system 110 may be configured to monitor a proximity of respective portable devices 120 during the OP registration period 510 to identify portable devices 120 that remain within the proximity threshold 425 for at least a first OP time threshold. The first OP time threshold may be a subset of the OP registration period 510 (e.g., may be less than or equal to a duration of the OP registration period 510).

In a third non-limiting example, the MV system 110 may determine OP metrics for respective portable devices 120 during the OP registration period 510. The OP metrics may be configured to quantify the proximity of respective portable devices 120 during the OP registration period 510. For example, the OP metric determined for a portable device 120 may comprise an average, mean, or other aggregation of distances 25 measured between the portable device 120 and the reference 108 of the MV system 110 during the OP registration period 510. The MV system 110 may be configured to identify portable devices 120 having OP metrics that satisfy the proximity threshold 425 (or other OP metric threshold) and may register the identified portable devices 120 as operators of the vehicle 102-1.

In a fourth non-limiting example, the MV system 110 may be configured to register operators at a designated OP registration time 510-1. The OP registration time 510-1 may correspond to the OP registration period 510; the OP registration time 510-1 may correspond to time at or between the start event 501 and the initialization completion event 503. The MV system 110 may determine distances 25 of respective portable devices 120, each distance 25 determined at the OP registration time 510-1 (and/or within a margin of the OP registration time 510-1, the margin corresponding to communication jitter, delay, or other factors). Portable devices 120 determined to be within the proximity threshold 425 at about the OP registration time 510-1 may be registered as operators of the vehicle 102-1.

Although specific examples of techniques for associating operators with machines 102 during an initial OP registration period 510 are described herein, the disclosure is not limited in this regard and could be adapted to register machine operators in based on any suitable scheme, criteria, mechanism, or technique.

The MV system 110 of a machine 102 may be further configured to monitor the registered operators of the machine 102 (e.g., implement an OP monitoring function). The OP monitoring function may comprise determining whether to retain respective portable devices 120 as operators of the machine 102 based, at least in part, on a proximity of the respective portable devices 120 during the OP monitoring period 515. As illustrated in the FIG. 5 example, the OP monitoring period 515 may begin at or after completion of initial OP registration (e.g., after the OP registration period 510 and/or OP registration time 510-1). The OP monitoring period 515 may terminate at or before the end of the operation cycle 500 (e.g., at or before the end event 505). During the OP monitoring period 515, the MV system 110 may prevent PED portable devices 120 that were not initially registered as operators of the machine 102 from being added or otherwise designated as operators of the machine 102. In other words, the MV system 110 may be configured to block PED portable devices 120 that were not registered as operators during the OP registration period 510 and/or at the OP registration time 510-1 from being designated as operators, regardless of whether the PED portable devices 120 are detected within the first proximity threshold 425 (e.g., as illustrated in FIG. 4C).

As disclosed herein, the OP monitoring function may comprise evaluating respective operators of the machine 102 to determine whether the respective operations should be retained as operators of the machine 102. The MV system 110 may be configured to modify the designation of selected OP portable devices 120. Modifying the classification of an OP portable device 120 may comprise "declassifying" the OP portable device 120 as a PED portable device 120 (e.g., may comprise removing the OP designation 354 from the portable device 120). As disclosed herein, the MV system 110 may declassify a portable device 120 from OP to PED by, inter alia, issuing a PED_CLS message 353 to the portable device 120.

Figure 6A:
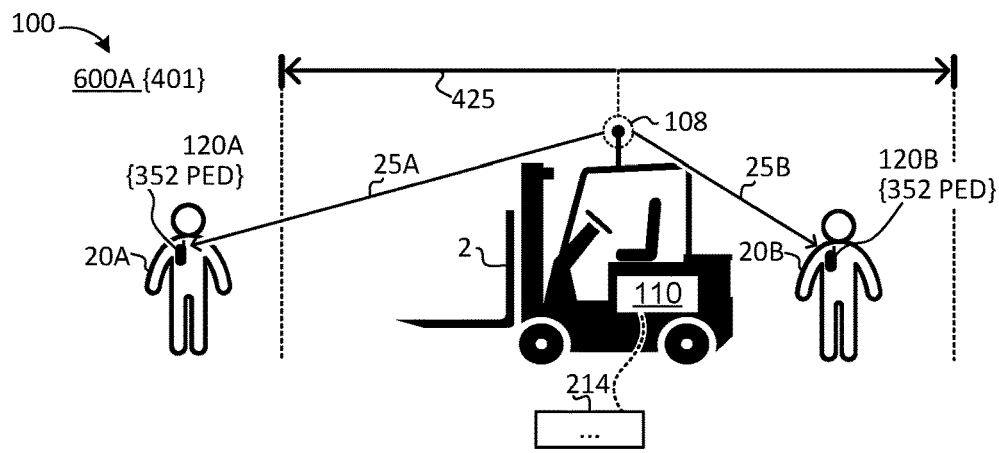
FIGS. 6A-6H are schematic block diagrams illustrating examples of machine or vehicle systems configured to register operators during an operator registration period.

FIG. 6A illustrates another example of a system 100 for associating machinery with operators. In state 600A illustrated in the FIG. 6A example, the vehicle 102-1 and corresponding MV system 110 are in an inactive state 401. Accordingly, the PD association data 214 may be empty (or undefined) and the portable devices 120A and 120B of persons 20A and 20B may be configured for operation in PED mode. In state 600B illustrated in the FIG. 6B example, the vehicle 102-1 has been started by the person 20B and, in response, the MV system 110 may implement an initial OP registration function, as disclosed herein (e.g., the state 600B may correspond to an initialization period 502 and/or OP registration period 510, as disclosed herein). As illustrated, the portable device 120B is within the first proximity threshold 425 and, as such, the portable device 120B may be registered as an operator of the vehicle 102-1. Registering the portable device 120B may comprise issuing an OP_CLS message 355 to the portable device 120B, the OP_CLS message 355 configured to cause the portable device 120B to operate in the OP mode, as disclosed herein (e.g., store an OP designation 354 in the PD configuration data 324 of the portable device 120B). The MV system 110 may be further configured to record that OP designation of the portable device 120B in the PD association data 214. The portable device 120A may remain designated as a PED and, as such, may continue to operate in the PED mode (and may be excluded from the PD association data 214 and/or designated as a PED therein).

Figure 6B:
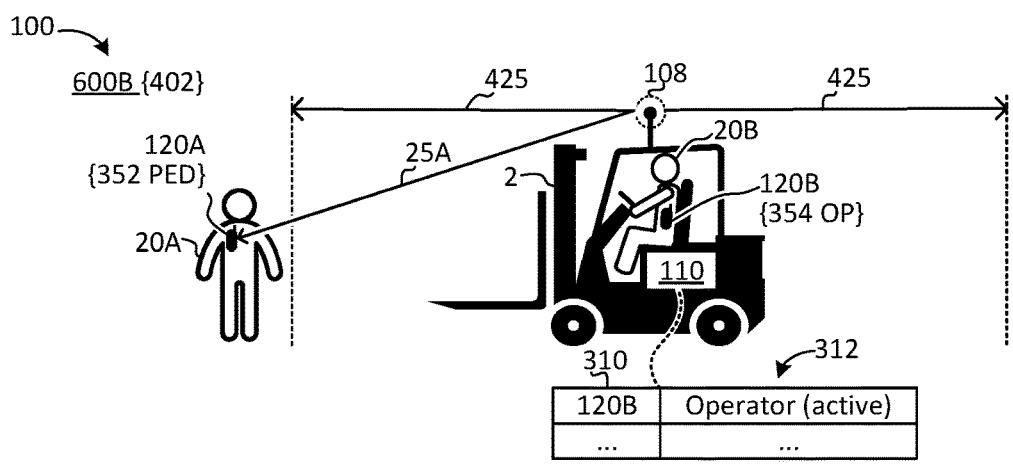

As illustrated in FIG. 6B, in some embodiments, the PD association data 214 may further comprise metadata 614 pertaining to respective OP portable devices 120. The metadata 614 may indicate a current status of the OP portable devices 120, such as whether the OP portable devices 120 are active or the like. As used herein, an "active" OP portable device 120 refers a portable device 120 detected within the first proximity threshold 425 (or other proximity threshold) within or during a first time threshold. By contrast, an "inactive" OP portable device 120 may refer to a portable device 120 determined to be outside of the first proximity threshold 425 and/or has remained outside of the first proximity threshold 425 for the first time threshold.

Figure 6C:
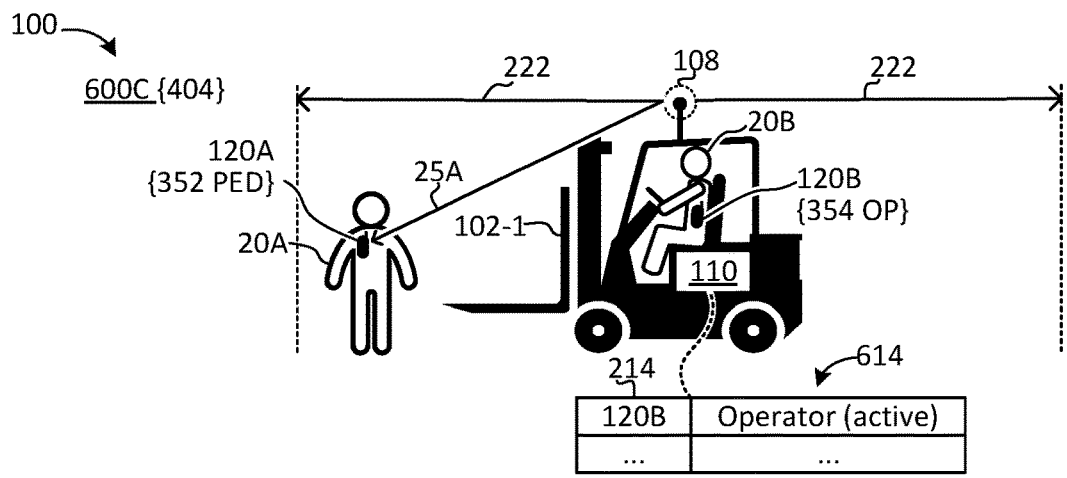

FIG. 6C illustrates another state 600C of the system 100. In state 600C the person 20A has moved within the first proximity threshold 425 of the MV system 110 (at distance 25A). The person 20A may also be within the protection zone 225 of the MV system 110 (not shown in FIG. 6C to avoid obscuring details of the illustrated examples). Although the portable device 120A is within the first proximity threshold 425, the portable device 120A may not be designated as an operator by the MV system 110 since, inter alia, the portable device 120A was not registered as an operator during initial OP registration (and, as such, is not included in the PD association data 214 of the MV system 110). Accordingly, the portable device 120A may trigger the PED detection function of the MV system 110.

Figure 6D:
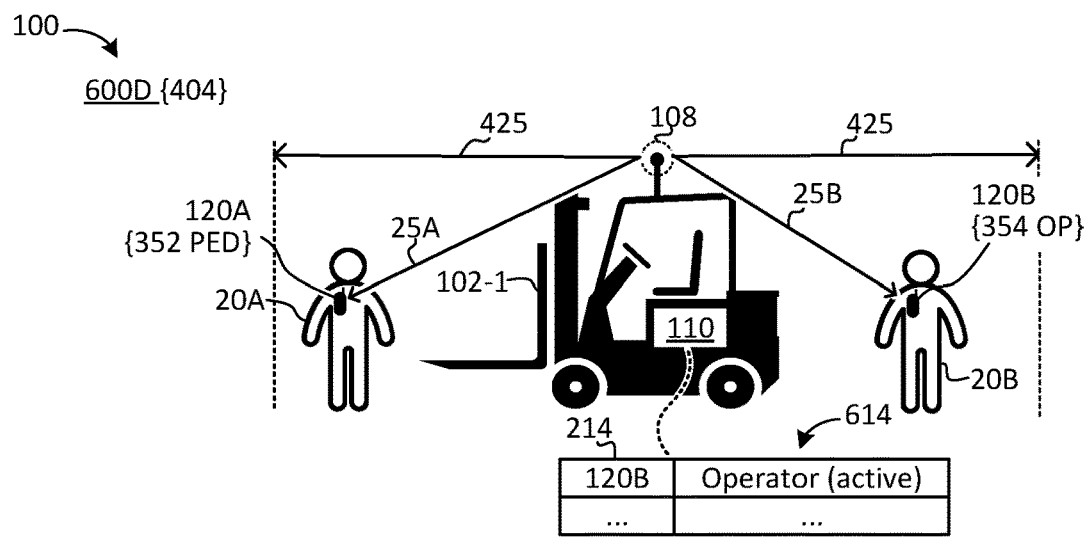

FIG. 6D illustrates another state 600D of the system 100. In state 600D, the person 20B has moved away from the vehicle 102-1 but is still within the first proximity threshold 425 (has moved to distance 25B within the first proximity threshold 425). In response, the MV system 110 may retain the "active" operator designation of the portable device 120B.

Figure 6E:
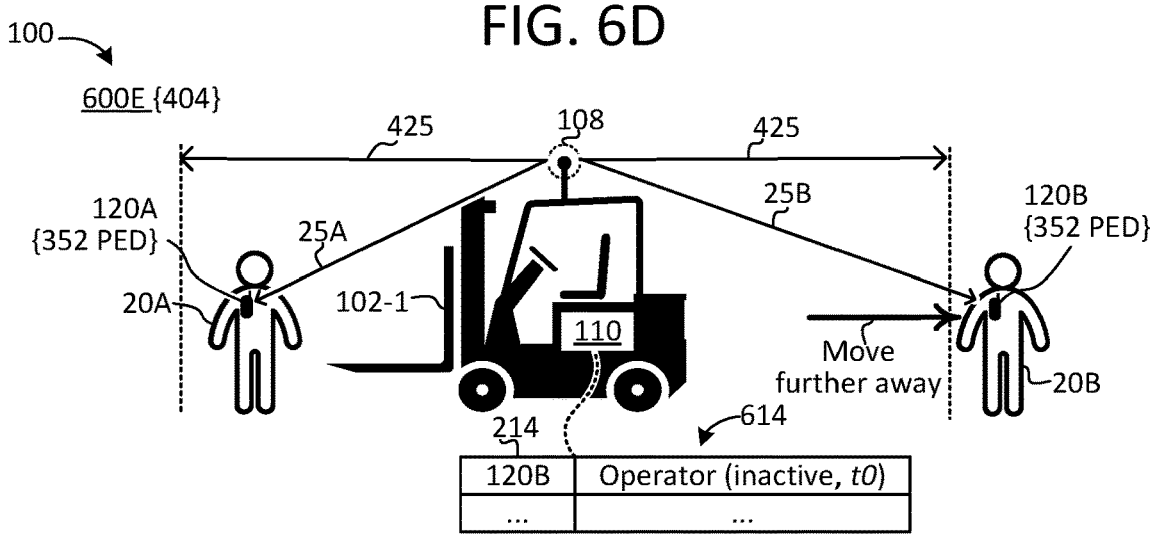

In state 600E of FIG. 6E, the person 20B has moved further away from the vehicle 102-1, to a distance 25B beyond the first proximity threshold 425. In response, the MV system 110 may update the PD association data 214 to indicate that the portable device 120B is inactive and/or indicate a time (t0) at which the portable device 120B moved beyond the first proximity threshold 425. The MV system 110 may be further configured to modify the designation of the portable device 120B from an OP device to a PED device, which may comprise configuring the portable device 120B to operate in the PED mode, as disclosed herein (e.g., in response to a communication limiting message, such as a PED_CLS message 353).

Figure 6F:
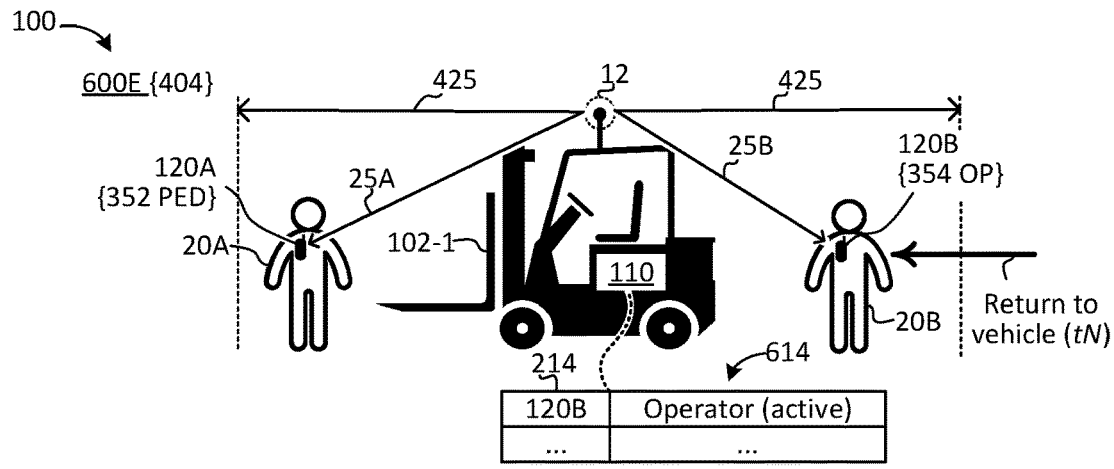

In state 600F of FIG. 6F, the person 20B has returned to a distance 25B within the first proximity threshold 425 at time (tN). The time (tN) may be less than a redesignation threshold (R_Th) of the MV system 110 and, as such, the portable device 120B may retain the OP designation (and the portable device 120B may continue to operate in the OP mode). The MV system 110 may be further configured to update the metadata 614 pertaining to the portable device 120B to indicate that the portable device 120B is designated as an "active" operator.

Figure 6G:
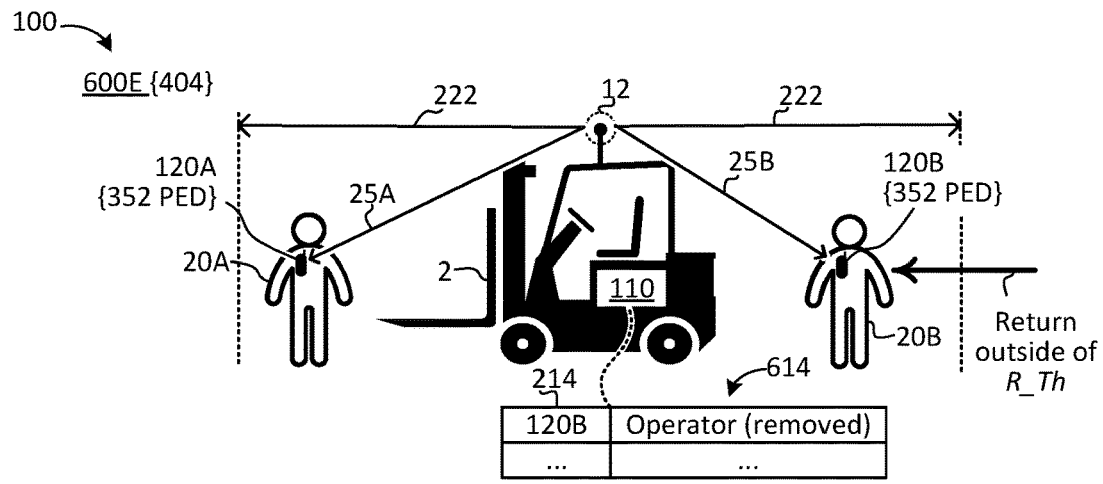

FIG. 6G illustrates a state 600G in which the portable device 120B remains outside of the first proximity threshold 425 beyond the redesignation threshold (R_TH). As illustrated, the OP designation 354 of the portable device 120B may be removed (and reverted to the PED designation 352). The OP designation may be removed by, inter alia, issuing a PED_CLS message 353 to the portable device 120B. Alternatively, or in addition, the OP designation may be removed by the PD logic 320 of the portable device 120B in response to determining that the portable device 120B has been outside of the first proximity threshold 425 and/or out of communication with the MV system 110 for at least the PD communication timeout threshold. The MV system 110 may be further configured to remove the portable device 120B from the PD association data 214 and/or record that the portable device 120B has been removed as an operator of the vehicle 102-1.

Figure 6H:
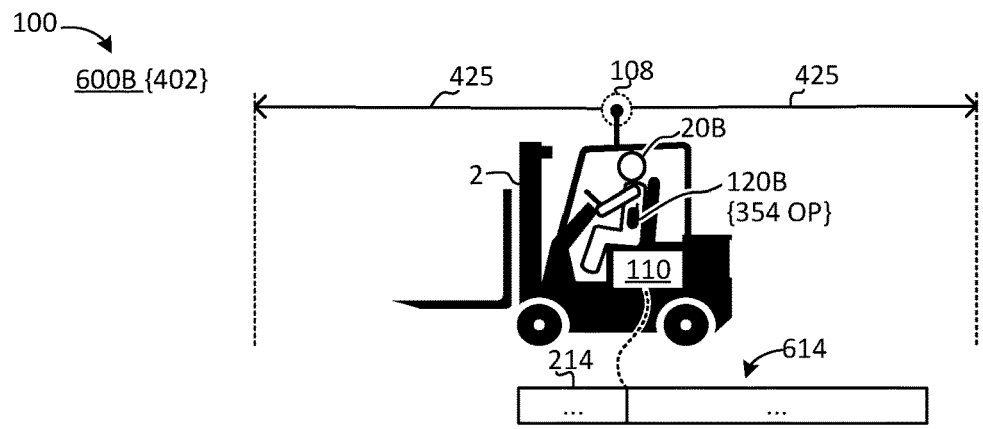

In some implementations, the MV system 110 may block the portable device 120B from being designated as an operator during the current operation cycle 500 of the vehicle 102-1 (and/or MV system 110). Accordingly, even if the portable device 120B remains within the first proximity threshold 425, as illustrated in state 600H of FIG. 6H, the portable device 120B will continue to trigger the PED detection function of the MV system 110 (even if the other portable device 120A is no longer in the general vicinity of the MV system 110).

In some embodiments, the redesignation threshold (R_Th) and/or PD communication timeout threshold may be configured to guide operator behavior. As disclosed above, the MV system 110 may block designation of the portable device 120B of the operator (person 20B) if the portable device 120B remains outside of the first proximity threshold 425 longer than the redesignation threshold (R_Th). As such, redesignating the portable device 120B as an operator may involve restarting the operation cycle 500 of the vehicle 102-1 (and/or MV system 110), which may be a tedious, time consuming process. Operators may wish to avoid the need for restarts and, as such, may be encouraged to remain in relatively close proximity to their vehicles 102-1.

Figure 7A:
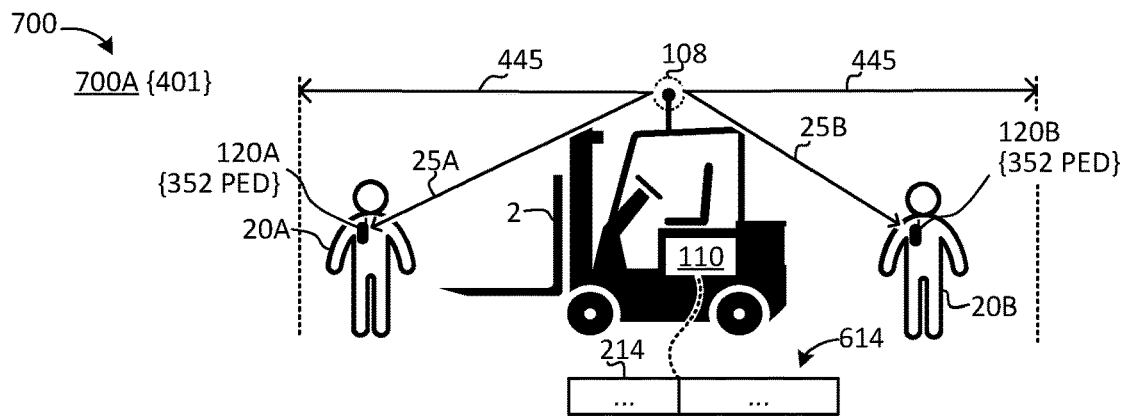
FIGS. 7A-7D are schematic block diagrams illustrating examples of systems and devices for associating operators with machinery.
Figure 7B:
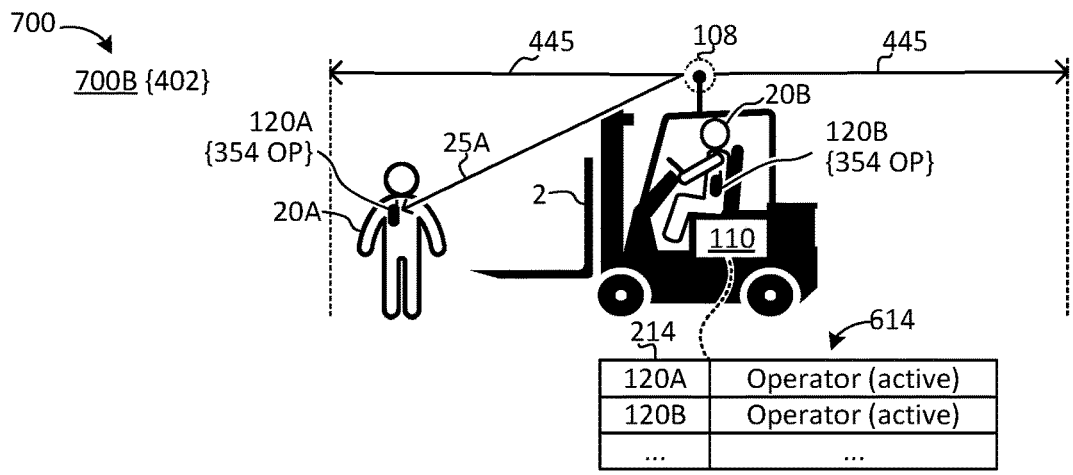

FIG. 7A illustrates another state 700A of a system 100 for associating operators with machinery as disclosed herein. In state 700A the vehicle 102-1 may be in an inactive state 401. In state 700B of FIG. 7B, the person 20B may startup the vehicle 102-1, which may cause the MV system 110 to implement an initial operator registration function, as disclosed herein. In the FIG. 7B example, both portable devices 120A and 120B are within the first proximity threshold 445 and, as such, both portable devices 120A and 120B may be designated as operators (and assigned the OP designation 354), as disclosed herein.

Figure 7C:
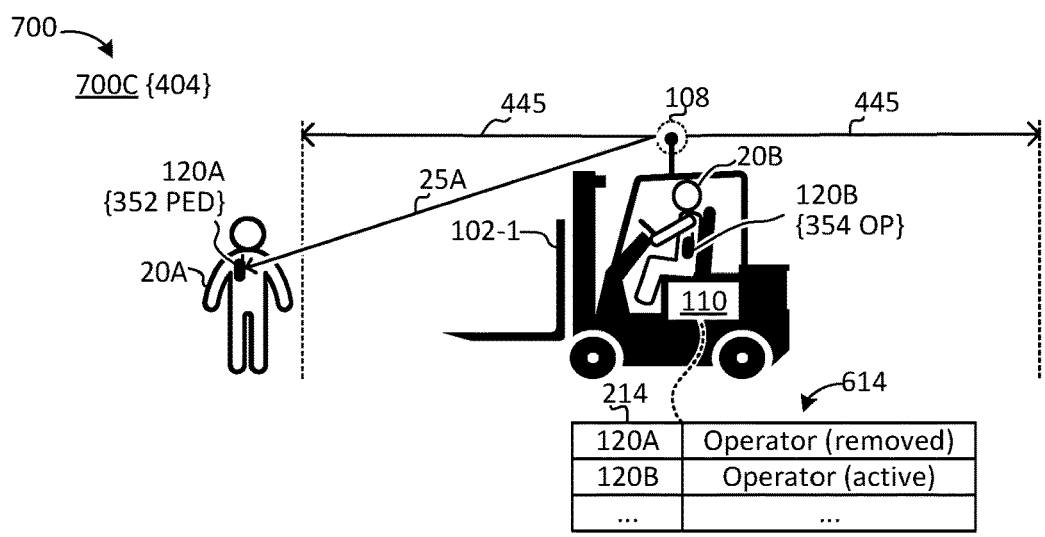
Figure 7D:
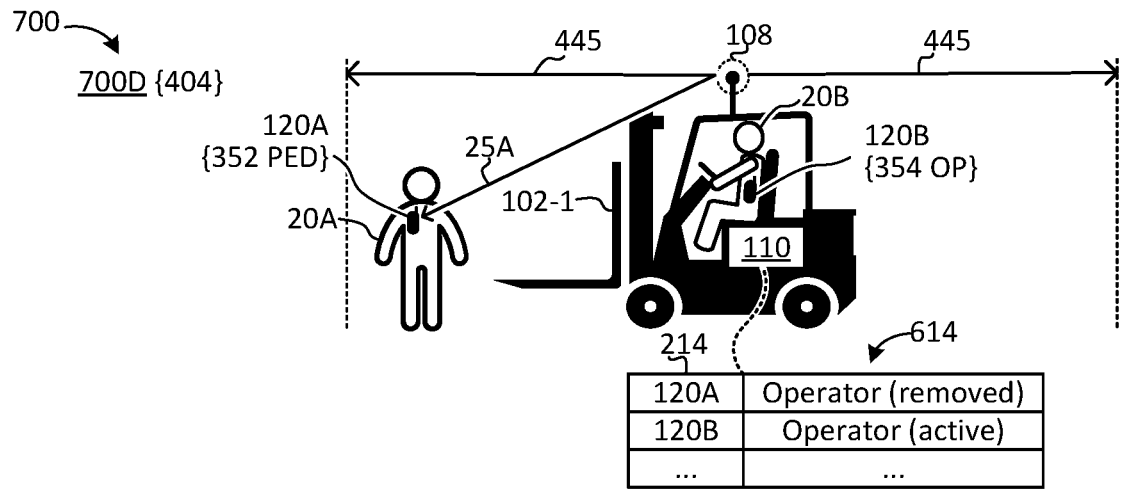

During operation, the vehicle 102-1 may move away from the non-operator (person 20A). The portable device 120A of person 20A may remain outside of the first proximity threshold 445 for longer than the redesignation threshold (R_Th) and/or PD communication timeout threshold and, as such, may be declassified back to the PED designation 352, as illustrated in state 700C of FIG. 7C. Therefore, if the portable device 120A returns within the first proximity threshold 425 to the vehicle 102-1 (as illustrated by distance 25A in state 700D of FIG. 7C), the portable device 120A may retain the PED designation 352. In state 700D, the portable device 120A may trigger the PED detection function of the MV system 110.

In some embodiments, the distances 25 determined by the MV system 110 may comprise distance magnitudes (e.g., may be substantially directionless). Alternatively, the distances 25 determined by the MV system 110 may comprise vector quantities. In other words, the MV system 110 may be configured to determine directional distances 25 to respective portable devices 125. The MV system 110 may utilize directional information to adapt one or more of the proximity thresholds disclosed herein.

Figure 8:
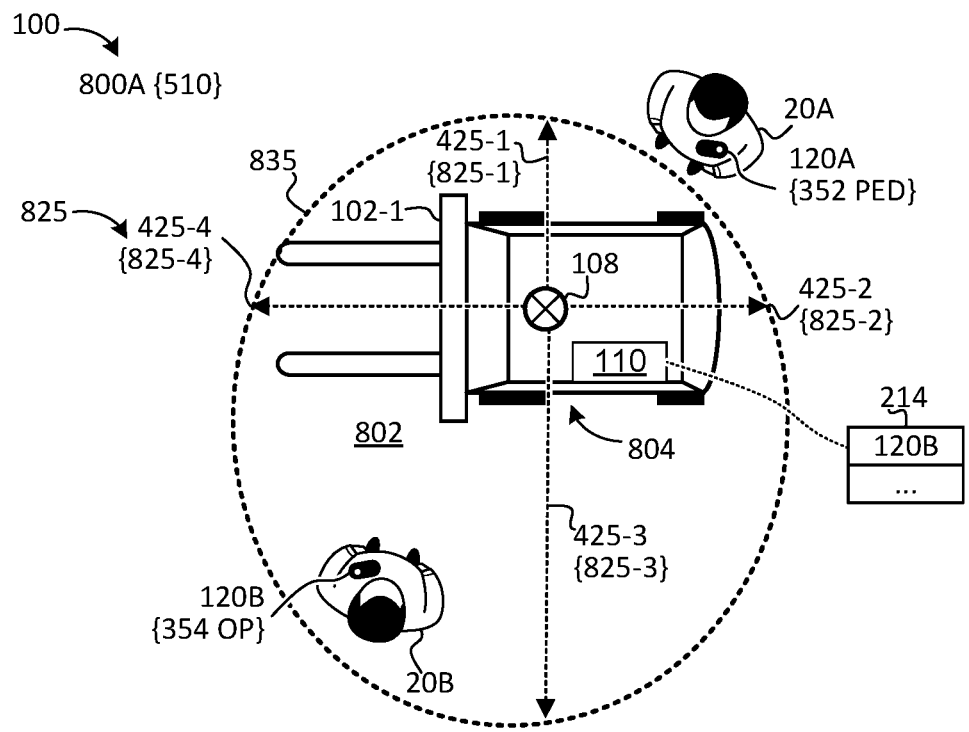
FIG. 8 is a schematic block diagram of a machine or vehicle system configured to implement directional proximity thresholds.

FIG. 8 illustrates an example of an MV system 100 configured to determine to implement directional proximity thresholds. In the FIG. 8 example, the MV system 100 of the vehicle 102-1 may be configured to register and/or retain operators based on non-uniform, directional thresholds, e.g., first proximity thresholds 425-1 through 425-4, each corresponding to a respective direction 825-1 through 825-4 relative to the frame of reference 108. The first proximity thresholds 425-1 through 425-4 may be configured to capture portable devices 120 within an operator region 802. As used herein, an operator region 802 may refer to a region in which an operator of a machine 102 or vehicle 102-2 is likely to be disposed during vehicle startup and/or initialization. For example, the operator region 802 illustrated in FIG. 8A may correspond to an access door 804 of the vehicle 102-1, location(s) at which the operator may be required to perform functionality or safety checks, and/or the like. As illustrated, the first proximity thresholds 425-1 through 425-4 may define a non-uniform proximity region 835, which may include portable devices 120 within the operator region 802 (e.g., portable device 120B) and exclude nearby portable devices 120 outside of the operator region 802 (e.g., portable device 120A). Accordingly, in state 800A, which may correspond to the OP registration period 510, the MV system 110 may register the portable device 120B as an operator while the portable device 120A is excluded and retains the PED designation 352. The person 20A wearing the portable device 120A may, therefore, be protected by the PED detection function of the MV system 110 throughout the operating period 504 of the vehicle 102-1, as opposed to being temporarily misclassified as an OP until revered to the PED designation 352 due to expiration of the redesignation threshold (R_Th), the PD communication timeout, or the like.

Figure 9:
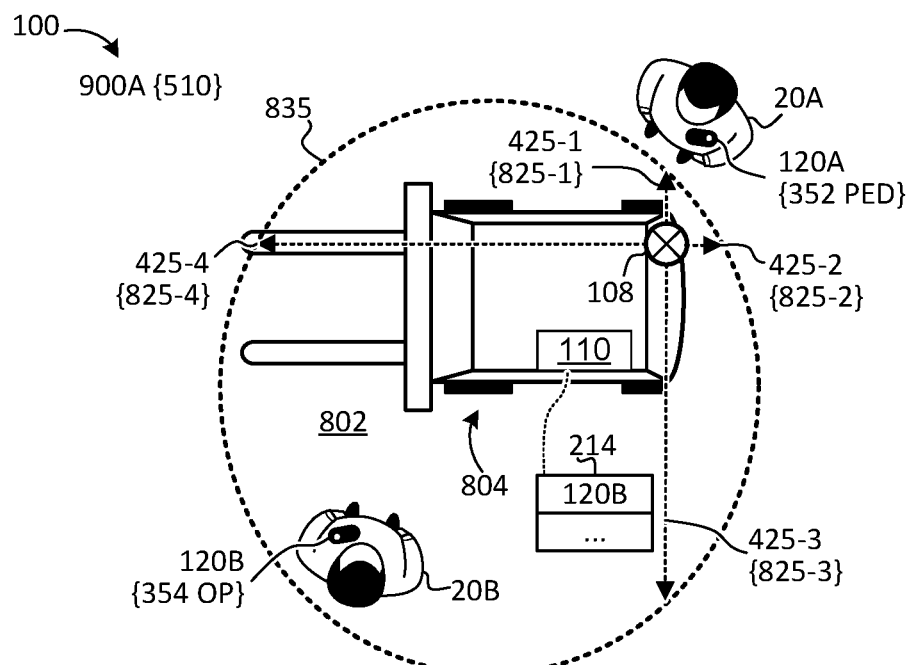
FIG. 9 is a schematic block diagram of another example of a machine or vehicle system configured to implement directional proximity thresholds.

FIG. 9 illustrates another example of an MV system 110 configured to implement a plurality of directional proximity thresholds 425-1 through 425-4 (corresponding to directions 825-1 through 825-4). The resulting proximity region 835 may be adapted to capture an operator region 802, as disclosed herein. The proximity thresholds 425-1 through 425-4 may be further adapted in accordance with a configuration of the frame of reference 108. As disclosed herein, the frame of reference 108 of the MV system 110 may correspond to a location of one or more MV antenna 218 on the vehicle 102-1. The placement of the MV antenna 218 may be based on various factors, such as damage avoidance, reception, network performance, and/or the like. As such, the antenna 218, and resulting frame of reference 108, may not correspond to a uniform or centralized location on the vehicle 102-1. For example, in the FIG. 9 example, the frame of reference 108-1 may be disposed on a rear corner of the vehicle 102-1. The proximity region 835 defined by the directional proximity thresholds 425-1 through 425-4 may be configured to cover the operator region 802 with respect to the frame of reference 108-1. As illustrated in FIG. 9, the MV system 110 may utilize the non-uniform proximity region 835 during initial OP registration of state 900A (e.g., the OP registration period 510) to register the portable device 120B as an operator and exclude the portable device 120A.

In some implementations, the MV system 110 may be configured to manage associations between machinery and operators based on a plurality of different thresholds. The MV system 110 may utilize the first proximity threshold 425 (and/or first proximity region 835) during initial operator registration and may utilize a second proximity threshold 1025 to determine whether to retain respective OP portable devices 120 following the initial operator registration (e.g., following the OP registration period 510). In some implementations, the first proximity threshold 425 and the second proximity threshold 1025 may be substantially the same or equivalent. Alternatively, the second proximity threshold 1025 may differ from the first proximity threshold. For example, the second proximity threshold 1025 may be larger and/or more inclusive than the first proximity threshold 1025. The second proximity threshold 1025 may be expanded to prevent inadvertent declassification of an operator due to, inter alia, litter, noise, communication drops, and/or the like. In some implementations, the MV system 110 may be configured to adapt the second proximity threshold 1025 to operating conditions. For example, the MV system 110 may be configured to expand the second proximity threshold 1025 in proportion to the velocity of the vehicle, since increased velocity may result in increased inaccuracy.

Figure 10A:
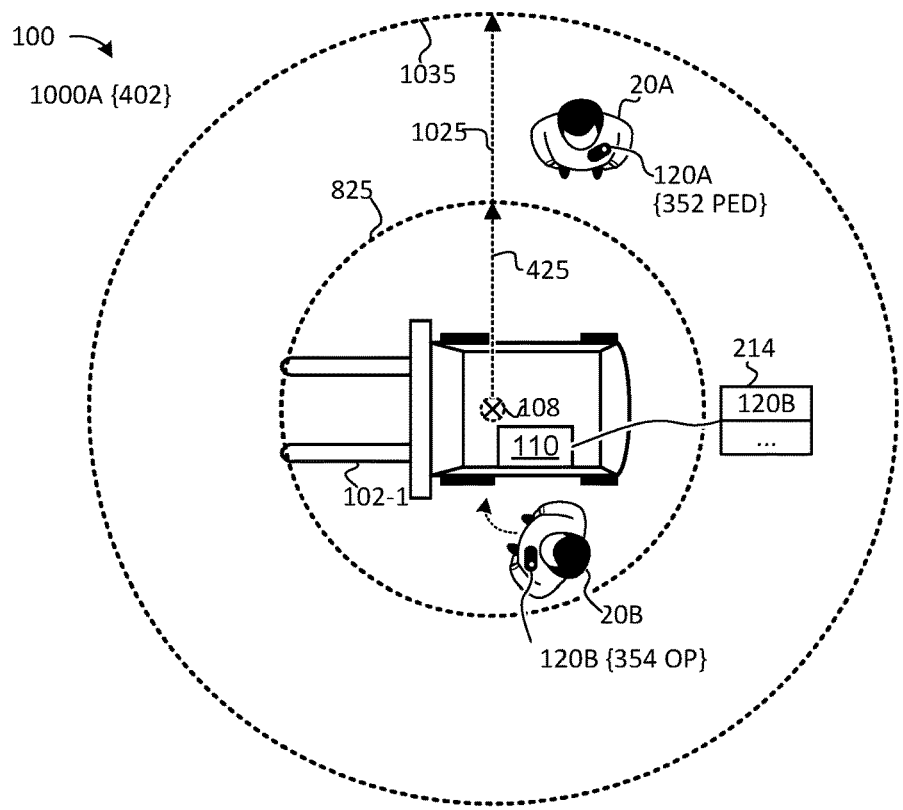
FIGS. 10A-10D are schematic block diagrams illustrating examples of systems and devices configured to implement multiple proximity thresholds.

FIG. 10A illustrates an example of an MV system 110 configured to implement first and second proximity thresholds 425 and 1025. State 1000A shown in FIG. 10A may correspond to an initialization period 402. In state 1000A, the MV system 110 may be configured to register operators, as disclosed herein. In the FIG. 10A example, the portable device 120B is within the first proximity threshold 425 and, as such, may be registered as an operator. Although the portable device 120B is within the second proximity region 1035 defined by the second proximity threshold 1025, the portable device 120B is outside of the first proximity region 835 of the first proximity threshold 425. Therefore, the portable device 120A may retain the PED designation 352 (and be detected by the PED detection function of the MV system 110).

Figure 10B:
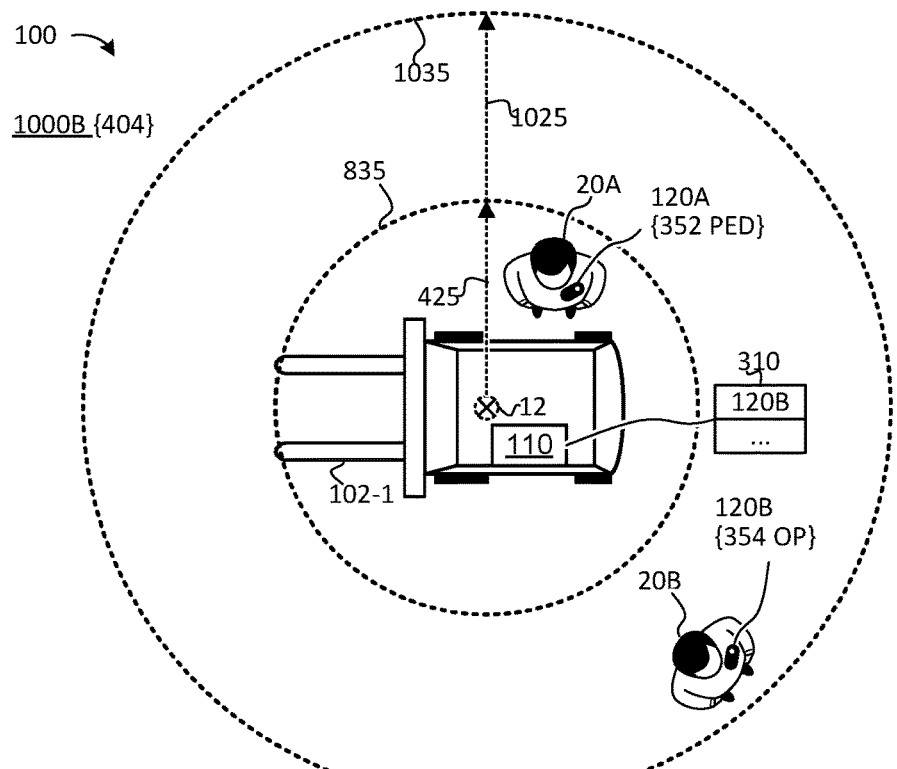

In state 1000B illustrated in FIG. 10B, the operator (person 20B) may move the portable device 120B outside of the first proximity threshold 425. In state 1000B, however, the portable device 120B may remain within the second proximity threshold 1025 and, as such, may remain designated as an "active" operator by the MV system 110. In addition, person 20A may move the portable device 120A into within the first proximity threshold. However, since the portable device 120A was not registered as an operator during the OP registration period 510, the MV system 110 may retain the portable device 120A in the PED mode.

Figure 10C:
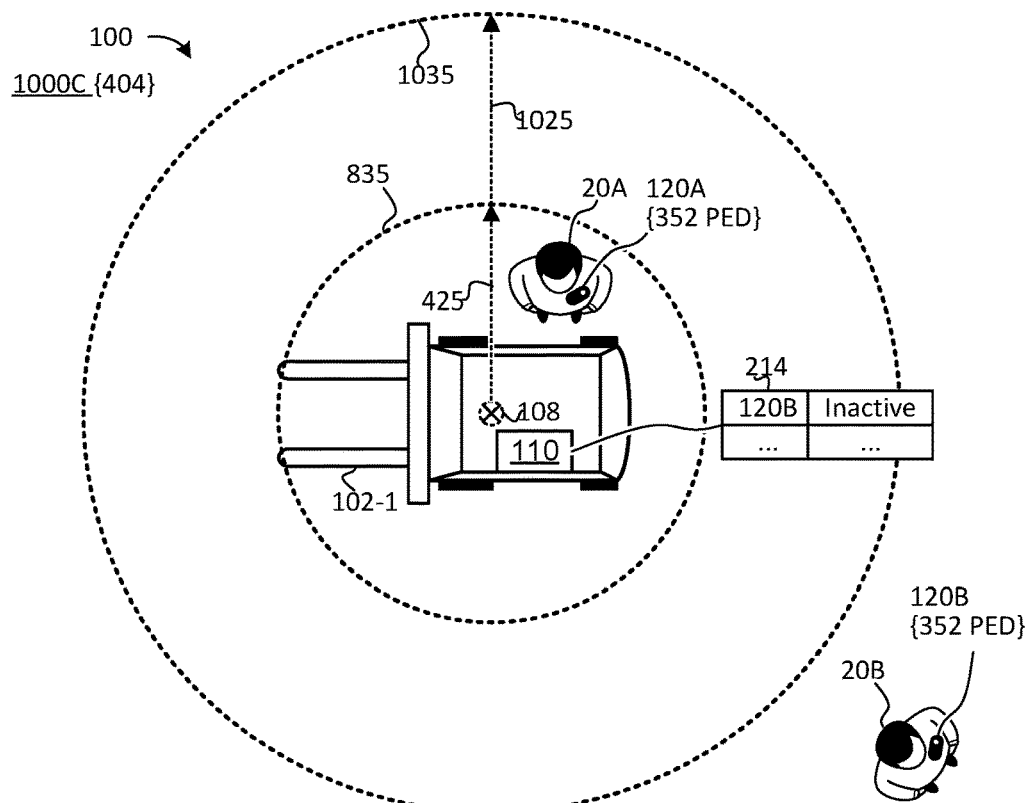

In state 1000C illustrated in FIG. 10C, the operator (person 20B) may move the portable device 120B outside of the second proximity region 1035 of the second proximity threshold 1025. In response, the MV system 110 may designate the portable device 120B as "inactive" in the PD association data 214, as disclosed herein. In some embodiments, the portable device 120B may continue operating in the OP mode. In the FIG. 10C, the MV system 110 may be configured to modify the portable device 120B for operation in PED mode. The MV system 110 may enable the portable device 120B to be reinstate the operator device designation if the portable device 120B is returns into the second proximity threshold 1025 within the redesignation threshold (R_Th), as illustrated in FIG. 10D.

Figure 10D:
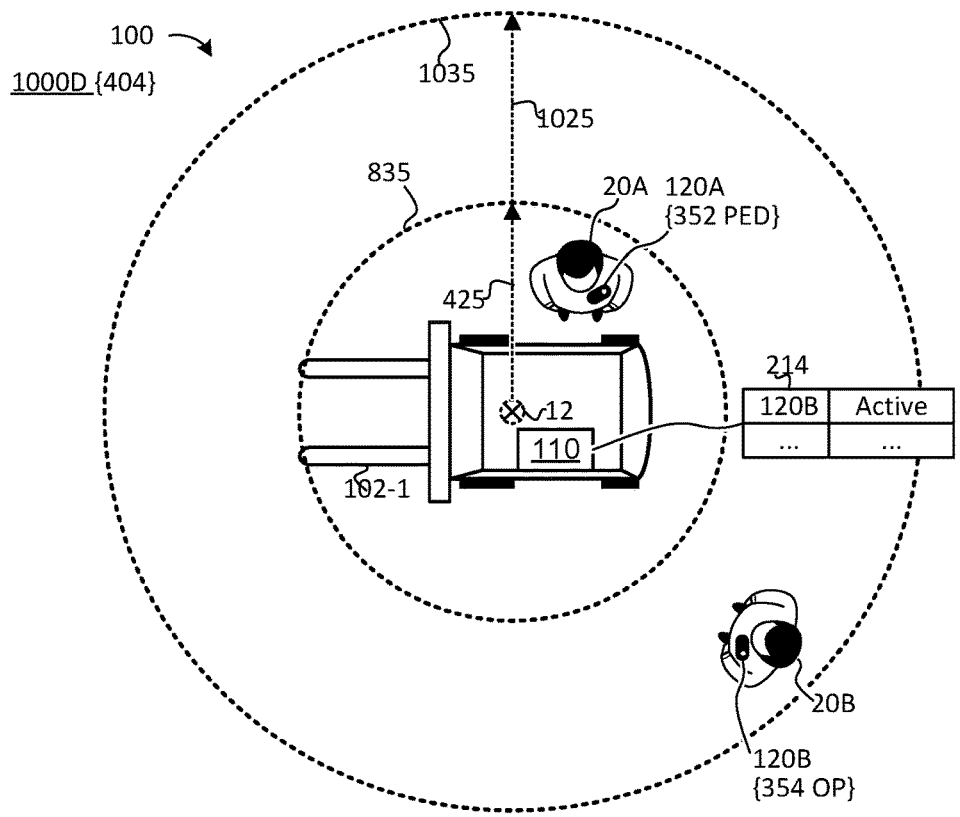

In state 1000D of FIG. 10D, the operator (person 20B) may move the portable device 120B back into the second proximity region 1035 prior to expiration of the redesignation threshold (R_Th). In response, the MV system 110 may update the PD association data 214 to indicate that the portable device 120B is "active." The portable device 120B may continue to operate in the OP mode. If, however, the portable device 120B were to remain outside of the second proximity threshold 1025 longer than the redesignation threshold (R_Th) and/or PD communication timeout, the portable device 120B would be configured with the PED designation 352, as disclosed herein.

Figure 11:
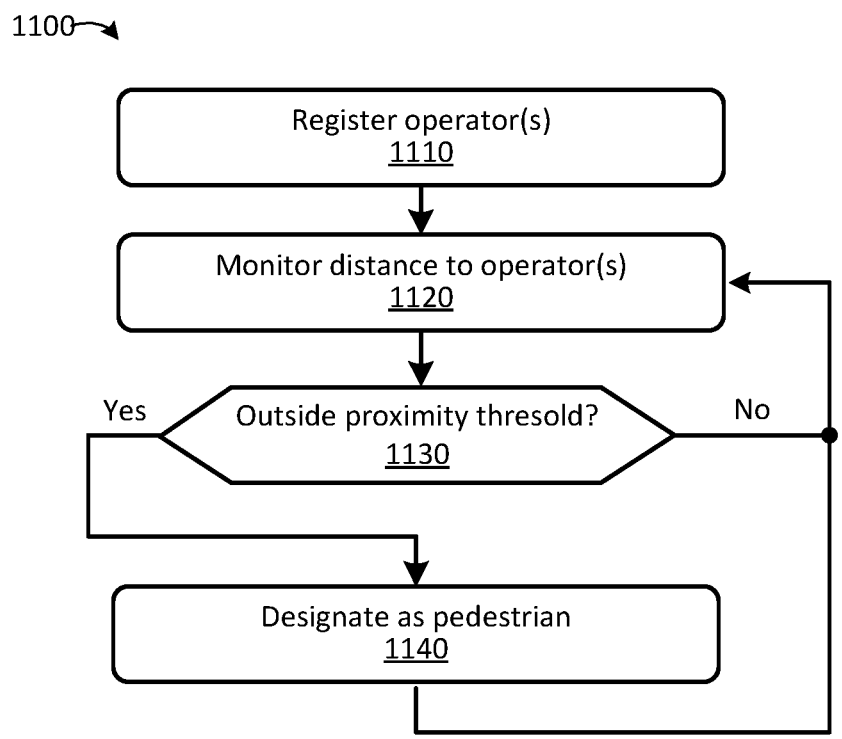
FIG. 11 is a flow diagram of one example of a method for associating operators with machinery.

FIG. 11 is a flow diagram of an example of a method 1100 for associating operators with machinery, as disclosed herein. Step 1110 may comprise registering one or more operators of a machine 102 or vehicle 102-1. Step 1110 may comprise identifying portable devices 120 that are within a first proximity threshold 425 to a frame of reference 108 and registering the identified portable devices 120 as operators. Registering a portable device 120 as an operator may comprise issuing an OP_CLS message 355 to the portable device 120, configuring the portable device 120 to apply the OP designation 354, configuring the portable device 120 to operate the OP mode, and/or the like. In some embodiments, step 1110 may be performed during an initialization period 502 of a machine 102 or vehicle 102-1, as disclosed herein (e.g., during activation of the machine 102 or vehicle 102-1). Alternatively, operator registration at step 1110 may be performed during an operating period 504, as illustrated in FIGS. 4A-4C.

Step 1120 may comprise monitoring the distance to OP portable devices 120. Step 1120 may comprise sending status messages 357 to the OP portable devices 120, as disclosed herein.

Step 1130 may comprise evaluating an OP portable device 120 to determine whether the OP portable device 120 is outside of a proximity threshold. The proximity threshold of step 1130 may comprise one or more first proximity thresholds 425. Alternatively, the proximity threshold of step 1130 may comprise one or more second proximity thresholds 825, as illustrated in FIGS. 10A-10D. In some embodiments, step 1130 may further comprise determining a time that the OP portable device 120 have been outside of the proximity threshold. Step 1130 may comprise comparing the elapsed time to a redesignation threshold (R_Th) or the like. If the OP portable device 120 is outside the proximity threshold (for a threshold time period), the flow may continue at step 1140; otherwise, the flow may continue at 1120 (or 1110).

Step 1140 may comprise removing the OP designation from the portable device 120, as disclosed herein. Step 1140 may comprise issuing a PED_CLS message 353 to the portable device 120, configuring the portable device 120 to apply the PED designation 352, configuration the portable device 120 to operate the PED mode, and/or the like.

Figure 12:
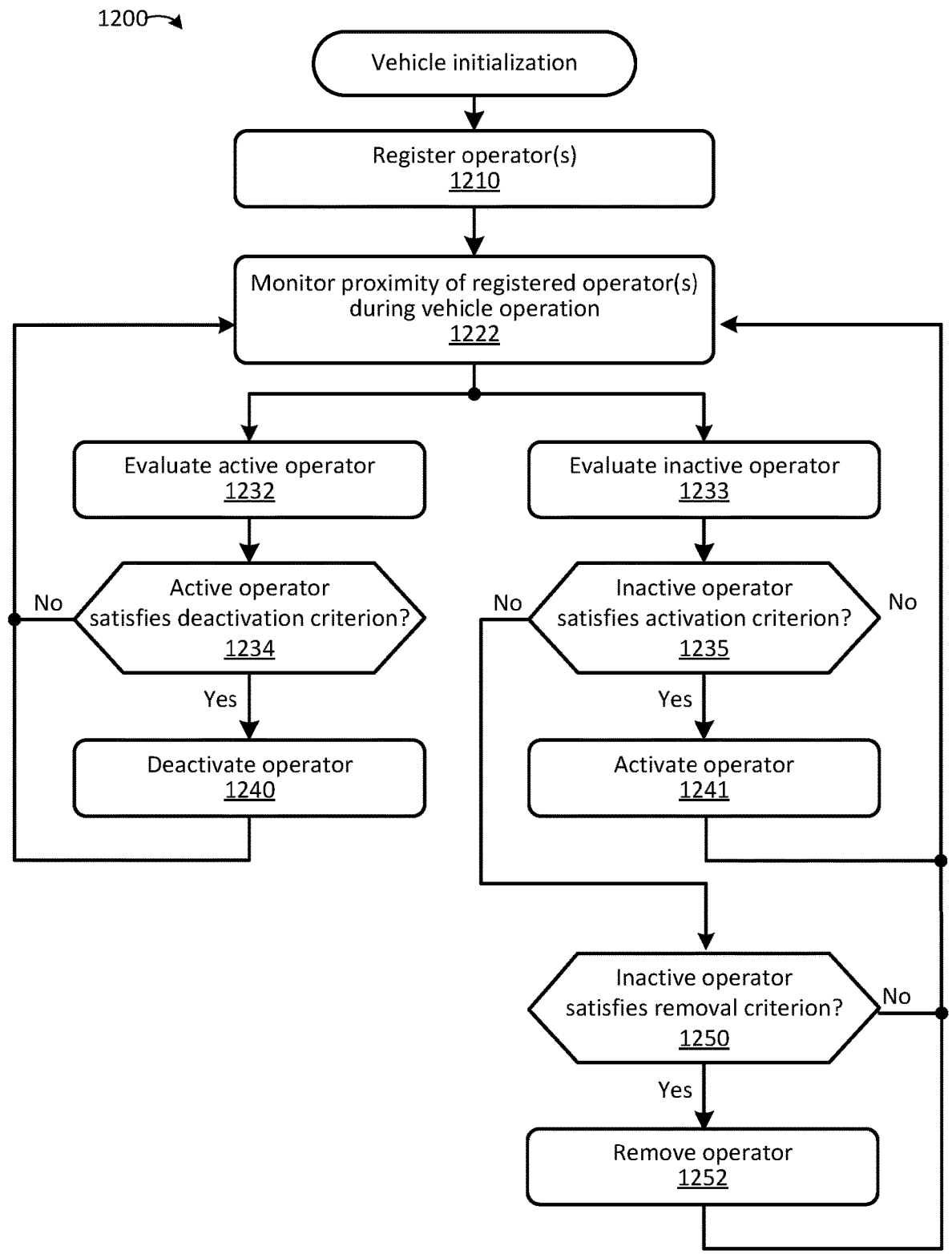
FIG. 12 is a flow diagram of another example of a method for associating operators with machinery.

FIG. 12 is a flow diagram of another example of a method 1200 for associating operators with machinery. At step 1210, the MV system 110 may be configured to register operators, as disclosed herein. Step 1210 may be implemented during an initialization period 502 (and/or in an initialization state 402), as disclosed herein. Step 1210 may, for example, by implemented in response to start event 501 of an operation cycle 500 of the vehicle 102-1.

Step 1222 may comprise monitoring a proximity of the OP portable devices 120 registered at 1210, as disclosed herein. The monitoring may comprise determining a distance 25 to respective portable devices 120 and comparing the determined distances to one or more proximity thresholds, such as a first proximity threshold, one or more directional proximity thresholds 425-1 through 425-4, a second proximity threshold 1025, directional second proximity thresholds 1025 and/or the like. Step 1232 may further comprise identifying OP portable devices 120 that are outside of the one or more proximity thresholds. OP portable devices 120 determined to be within the one or more proximity thresholds may be marked as "active" in the PD association data, and OP portable devices 120 determined to be outside of the one or more proximity thresholds may be marked as "inactive."

Steps 1232, 1234, and 1240 may comprise evaluating an "active" OP portable device 120 (if any). Step 1232 may comprise determining whether the OP portable device 120 should retain the "active" designation based, at least in part, on evaluation of deactivation criterion at step 1234. The deactivation criterion may be based on the monitored proximity of the OP portable device 120. If the OP portable device 120 is outside the one or more proximity thresholds, the flow may continue at 1240; otherwise, the flow may continue at 1222 where a next OP portable device 120 may be evaluated (if any). Step 1240 may comprise recording that the OP portable device 120 is "inactive" as disclosed herein. Step 1240 may further comprise modifying the designation of the portable device 120 to a pedestrian device, as disclosed herein.

Steps 1233, 1235, and 1241, 1250, and 1252 may comprise evaluating an "inactive" OP portable device 120 (if any). Step 1233 may comprise determining whether the OP portable device 120 should retain the "inactive" designation based, at least in part, on evaluation of an activation criterion at step 1234. The activation criterion may be based on the monitored proximity of the OP portable device 120. If the OP portable device 120 is within the one or more proximity thresholds, the flow may continue at 1241; otherwise, the flow may continue at 1250. At 1241 the OP portable device 120 may be designated as "active" in the PD association data 214, as disclosed herein. Step 1241 may further comprise modifying the designation of the portable device 120 from a pedestrian device to an operator device, as disclosed herein (e.g., by issuing an OP_CLS message 355 to the portable device 120).

Step 1250 may comprise evaluating removal criterion to determine whether the "inactive" OP portable device 120 should be removed. Step 1250 may comprise determining whether the OP portable device 120 has remained outside the one or more proximity thresholds for longer than a redesignation threshold (R_Th) or the like. If the OP portable device 120 satisfies the removal criterion, the flow may continue at 1252; otherwise, the flow may continue at 1222 where a next OP portable device 120 may be evaluated (if any). Step 1252 may comprise configuring the OP portable device 120 to operate in accordance with the PED designation 352, removing the OP portable device 120 from the PD association data 214, and/or the like.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general-purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

The invention claimed is:

1. A machine or vehicle (MV) system configured for communication with remote portable devices, the MV system comprising:
    a first communication module configured to determine distances between a frame of reference associated with a materials-handling vehicle and respective portable devices; and
    a first logic configured to classify a first portable device as an operator device solely in response to determining a first distance by the first communication module;
    wherein the first logic is further configured to exclude the first portable device from a pedestrian detection function in response to classifying the first portable device as an operator device.

2. The system of claim 1, wherein the first portable device comprises a second communication module configured for two-way communication with the first communication module.

3. The system of claim 1, wherein the first portable device is configured for operation in one of a pedestrian mode and an operator mode, wherein, in the pedestrian mode, the first portable device is configured to broadcast a detection signal, and wherein, in the operator mode, the first portable device is configured to terminate the broadcast of the detection signal.

4. The system of claim 1, wherein the first logic is configured to classify the first portable device as an operator device in response to determining that the first distance is within a first proximity threshold.

5. The system of claim 4, wherein the first logic is configured to classify the first portable device as an operator device during an operator registration period, and wherein the first logic is further configured to block classification of a second portable device detected within the first proximity threshold following the operator registration period.

6. The system of claim 1, wherein the first logic is configured to classify the first portable device as an operator device in response to determining that the first distance is within a proximity region defined by one or more directional proximity thresholds.

7. The system of claim 4, wherein the first logic is configured to classify the first portable device as a pedestrian device in response to determining that a distance between the first portable device and the frame of reference exceeds a second proximity threshold.

8. The system of claim 7, wherein the first logic is configured to classify the first portable device as an operator device in response to detecting the first portable device within the second proximity threshold.

9. A method comprising:
    determining a proximity of one or more portable devices to a materials-handling machine during an operator registration period of the materials-handling machine, wherein each portable device of the one or more portable devices is configured to broadcast a respective detection signal;
    identifying a portable device within a first proximity threshold of the materials-handling machine during the operator registration period; and
    classifying the identified portable device as an operator device of the materials-handling machine, the classifying comprising causing the identified portable device to terminate broadcast of a detection signal.

10. The method of claim 9, further comprising:
    detecting the proximity of the one or more portable devices in response to a power-on event.

11. The method of claim 9, further comprising:
    issuing an operator classification message to the identified portable device, the operator classification message configured to cause the identified portable device to transition from operation in a pedestrian mode to operation in an operator mode.

12. The method of claim 9, further comprising:
    monitoring a proximity of the identified portable device during an operation period of the machine; and
    determining whether to reclassify the identified portable device as a pedestrian device based, at least in part, on the monitoring.

13. The method of claim 12, further comprising:
    classifying the identified portable device as an inactive operator device in response to determining that the identified portable device is outside a second proximity threshold.

14. The method of claim 13, further comprising:
    reclassifying the identified portable device as an operator device in response to determining that the identified portable device is within the second proximity threshold.

15. The method of claim 13, wherein the second proximity threshold differs from the first proximity threshold.

* * * * *

UNITED STATES PATENT AND TRADEMARK OFFICE
CERTIFICATE OF CORRECTION

| | |
|---|---|
| PATENT NO. | : 12,028,773 B2 |
| APPLICATION NO. | : 17/459852 |
| DATED | : July 2, 2024 |
| INVENTOR(S) | : Draayer et al. |

It is certified that error appears in the above-identified patent and that said Letters Patent is hereby corrected as shown below:

In the Drawings

Sheet 13 of 14, in "Fig. 11", delete "thresold" and insert --threshold-- therefor.

In the Specification

In Column 5, Line 20, delete "such a" and insert --such as-- therefor.

In Column 11, Line 31, delete "associated to" and insert --associated with-- therefor.

In Column 15, Line 21, delete "in based" and insert --based-- therefor.

In Column 16, Line 15, delete "that OP" and insert --the OP-- therefor.

In Column 20, Line 4, delete "to be" and insert --to-- therefor.

In Column 20, Line 5, delete "is returns" and insert --returns-- therefor.

In Column 20, Line 60, delete "configuration the" and insert --configuring the-- therefor.

In Column 20, Line 67, delete "may, for example, by" and insert --may, for example, be-- therefor.

Signed and Sealed this
Third Day of December, 2024

*Katherine Kelly Vidal*

Katherine Kelly Vidal
*Director of the United States Patent and Trademark Office*